United States Patent
Boulanger et al.

(10) Patent No.: US 12,374,921 B2
(45) Date of Patent: Jul. 29, 2025

(54) APPARATUS FOR WIRELESS POWER TRANSMISSION AND METHOD OF USE THEREOF

(71) Applicant: Quaze Technologies Inc., St-Jean-sur-Richelieu (CA)

(72) Inventors: Philippe Boulanger, St-Jean-sur-Richelieu (CA); Xavier Bidaut, Montréal (CA)

( * ) Notice: Subject to any disclaimer, the term of this patent is extended or adjusted under 35 U.S.C. 154(b) by 0 days.

(21) Appl. No.: 17/406,629

(22) Filed: Aug. 19, 2021

(65) Prior Publication Data

US 2022/0181913 A1    Jun. 9, 2022

Related U.S. Application Data

(63) Continuation of application No. 17/095,381, filed on Nov. 11, 2020, now Pat. No. 11,133,714.

(Continued)

(51) Int. Cl.
*H02J 50/12* (2016.01)
*H02J 50/00* (2016.01)
(Continued)

(52) U.S. Cl.
CPC ............ *H02J 50/12* (2016.02); *H02J 50/005* (2020.01); *H02J 50/402* (2020.01); *H02J 50/50* (2016.02)

(58) Field of Classification Search
CPC ........... H02J 50/12; H02J 50/50; H02J 50/502
See application file for complete search history.

(56) References Cited

U.S. PATENT DOCUMENTS

| 8,427,101 B2 | 4/2013 | Saunamäki |
| 8,536,736 B2 | 9/2013 | Abramo et al. |

(Continued)

FOREIGN PATENT DOCUMENTS

| EP | 2617120 B1 | 1/2017 |
| JP | 2006034044 A | 2/2006 |

(Continued)

OTHER PUBLICATIONS

Awai, Ikuo. "Basic characteristics of "Magnetic resonance" wireless power transfer system excited by a 0 ohm power source." IEICE Electronics Express 10.21 (2013): 20132008-20132008. https://www.jstage.jst.go.jp/article/elex/10/21/10_10.20132008/_pdf.

(Continued)

*Primary Examiner* — Rexford N Barnie
*Assistant Examiner* — Rasem Mourad
(74) *Attorney, Agent, or Firm* — Anglehart et al.

(57) ABSTRACT

A wireless power transfer apparatus for providing wireless power; it has an array of resonators; a powered resonator for providing power through electromagnetic resonance to said array of resonators; wherein said resonators transfer power from said powered resonator to any one of said array of resonators for delivering wireless power to said device by a modified connection between said array of resonators except the powered resonator; and/or wireless weak electromagnetic field coupling between neighboring resonators of said array of resonators each having a tuning frequency of resonance wherein said array of resonators has at least two distinct tuning frequencies from all the resonators constituting said array of resonators; wherein said modified connection is one of or a combination of: a wired connection; and a strong electromagnetic field coupling.

14 Claims, 25 Drawing Sheets

Related U.S. Application Data

(60) Provisional application No. 63/109,190, filed on Nov. 3, 2020.

(51) Int. Cl.
*H02J 50/40* (2016.01)
*H02J 50/50* (2016.01)

(56) References Cited

U.S. PATENT DOCUMENTS

| | | |
|---|---|---|
| 8,941,353 B2 | 1/2015 | Di Guardo |
| 9,276,641 B2 | 3/2016 | Hur et al. |
| 9,343,910 B2 | 5/2016 | Akuzawa et al. |
| 9,502,925 B2 | 11/2016 | Kim et al. |
| 9,525,302 B2 | 12/2016 | Throngnumchai et al. |
| 9,601,266 B2 | 3/2017 | Karalis et al. |
| 9,672,975 B2 | 6/2017 | Keeling et al. |
| 9,825,672 B2 | 11/2017 | Lee et al. |
| 9,923,387 B2 | 3/2018 | Lin et al. |
| 10,003,128 B2 | 6/2018 | Akuzawa et al. |
| 10,044,234 B2 | 8/2018 | Muurinen et al. |
| 10,097,046 B2 | 10/2018 | Plekhanov et al. |
| 2008/0278264 A1 | 11/2008 | Karalis et al. |
| 2010/0109445 A1 | 5/2010 | Kurs et al. |
| 2010/0231053 A1 | 9/2010 | Karalis et al. |
| 2010/0259108 A1 | 10/2010 | Giler et al. |
| 2011/0025132 A1* | 2/2011 | Sato .................. A61B 1/00029 307/104 |
| 2011/0101788 A1 | 5/2011 | Sun et al. |
| 2012/0086281 A1 | 4/2012 | Kanno |
| 2013/0026850 A1 | 1/2013 | Throngnumchai et al. |
| 2013/0063230 A1* | 3/2013 | Syms .................... H01P 5/028 333/24 R |
| 2013/0069753 A1 | 3/2013 | Kurs et al. |
| 2013/0175875 A1 | 7/2013 | Kurs et al. |
| 2013/0200721 A1* | 8/2013 | Kurs .................... H02J 50/90 307/104 |
| 2013/0334892 A1 | 12/2013 | Hall et al. |
| 2014/0028112 A1* | 1/2014 | Hui ...................... H02J 50/12 307/104 |
| 2014/0049118 A1 | 2/2014 | Karalis et al. |
| 2014/0181782 A1 | 6/2014 | Verghese et al. |
| 2014/0252875 A1* | 9/2014 | Lee ...................... H02J 50/502 307/104 |
| 2015/0045227 A1 | 2/2015 | Ahn et al. |
| 2015/0214747 A1* | 7/2015 | Abe ...................... H02J 50/12 307/104 |
| 2016/0013661 A1 | 1/2016 | Kurs et al. |
| 2016/0079811 A1* | 3/2016 | Seo ...................... H02J 50/40 307/104 |
| 2016/0268814 A1 | 9/2016 | McCauley et al. |
| 2017/0054329 A1 | 2/2017 | You et al. |
| 2017/0167250 A1* | 6/2017 | Skinner ................ E21B 47/16 |
| 2017/0373539 A1 | 12/2017 | Von Novak, III et al. |
| 2018/0301932 A1* | 10/2018 | Mansell ................ B60L 53/57 |
| 2020/0127494 A1 | 4/2020 | Steven et al. |
| 2021/0066950 A1* | 3/2021 | Cai ........................ H01F 38/14 |

FOREIGN PATENT DOCUMENTS

| | | |
|---|---|---|
| WO | 2012011531 A1 | 1/2012 |
| WO | 2013113017 A1 | 8/2013 |
| WO | 2015037690 A1 | 3/2015 |
| WO | 2015196123 A2 | 12/2015 |
| WO | 2012037279 A1 | 1/2017 |
| WO | 2018229494 A1 | 12/2018 |

OTHER PUBLICATIONS

Kurs, Andre, et al. "Wireless power transfer via strongly coupled magnetic resonances." science 317.5834 (2007): 83-86. http://www2.lns.mit.edu/fisherp/83.pdf.

Tsay, Alan, and Vien Van. "Analytic theory of strongly-coupled microring resonators." IEEE Journal of Quantum Electronics 47.7 (2011): 997-1005. http://www.ece.ualberta.ca/~vien/JQE2011_Analytic_theory_of_CMRs.pdf.

Tseng et al. "Introduction to the Alliance for Wireless Power Loosely-Coupled Wireless Power Transfer System Specification Version 1.0", 2013 IEEE Wireless Power Transfer (WPT), May 15-16, 2013.

International application No. PCT/CA2021/051560 International Search Report dated Mar. 1, 2022.

International application No. PCT/CA2021/051560 Written Opinion of the International Searching Authority dated Mar. 1, 2022.

European application No. 21887952.6, the extended European search report dated Feb. 5, 2025.

* cited by examiner

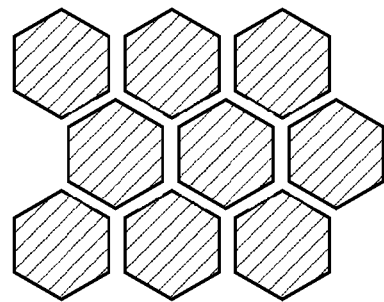
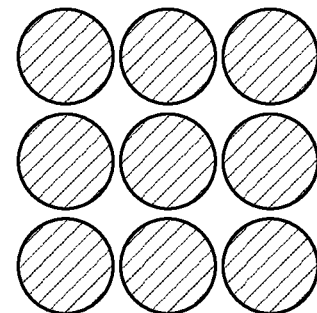
FIG. 11A　　　　FIG. 11B
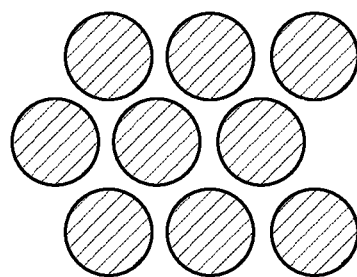
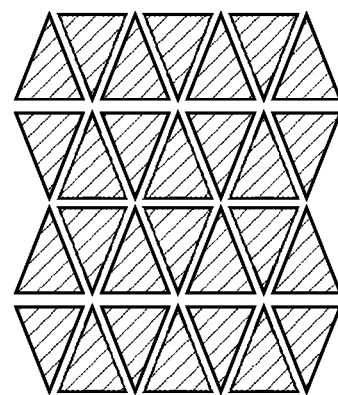
FIG. 11C
FIG. 11D
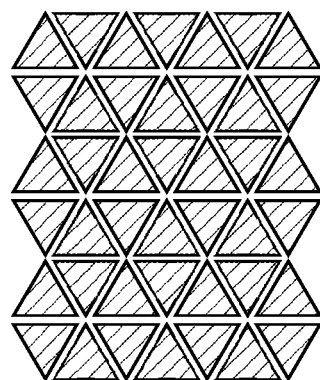
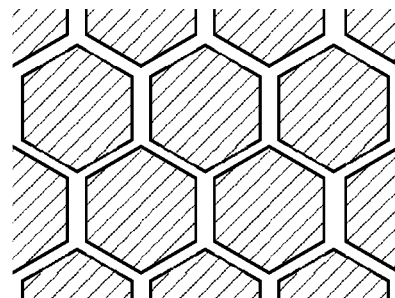
FIG. 11E　　　　FIG. 11F

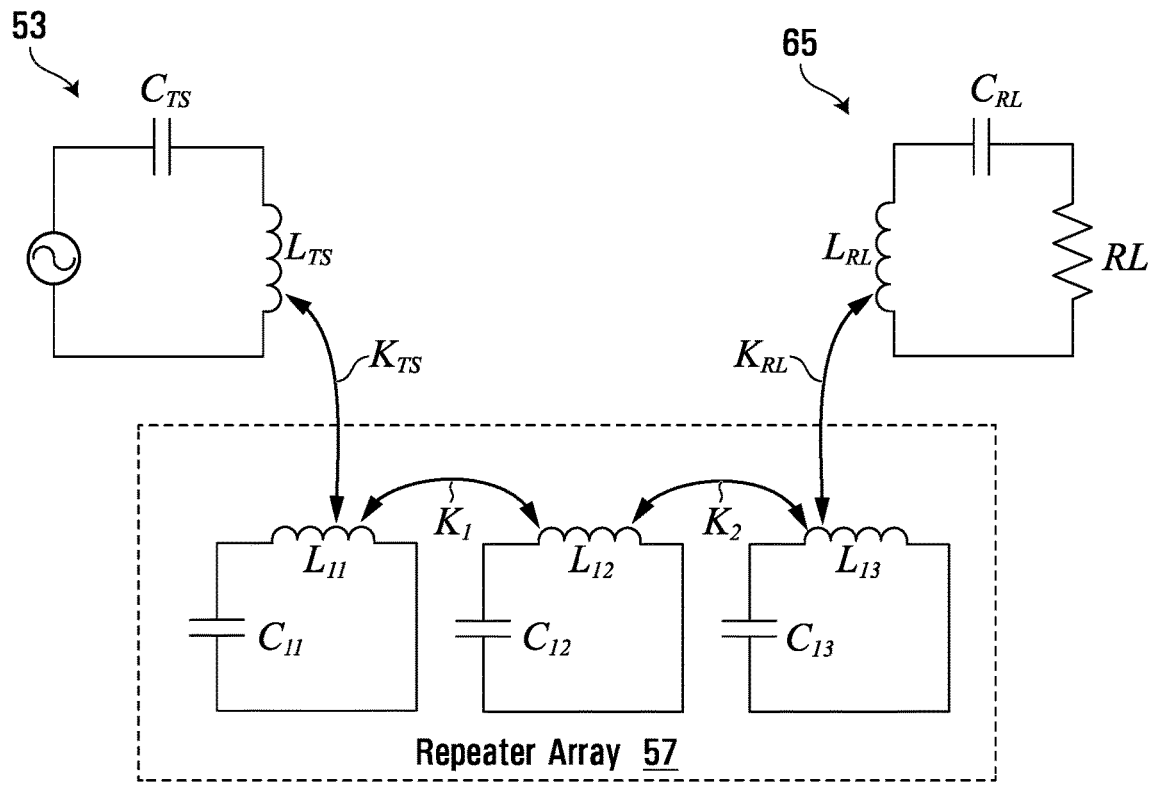
FIG. 19
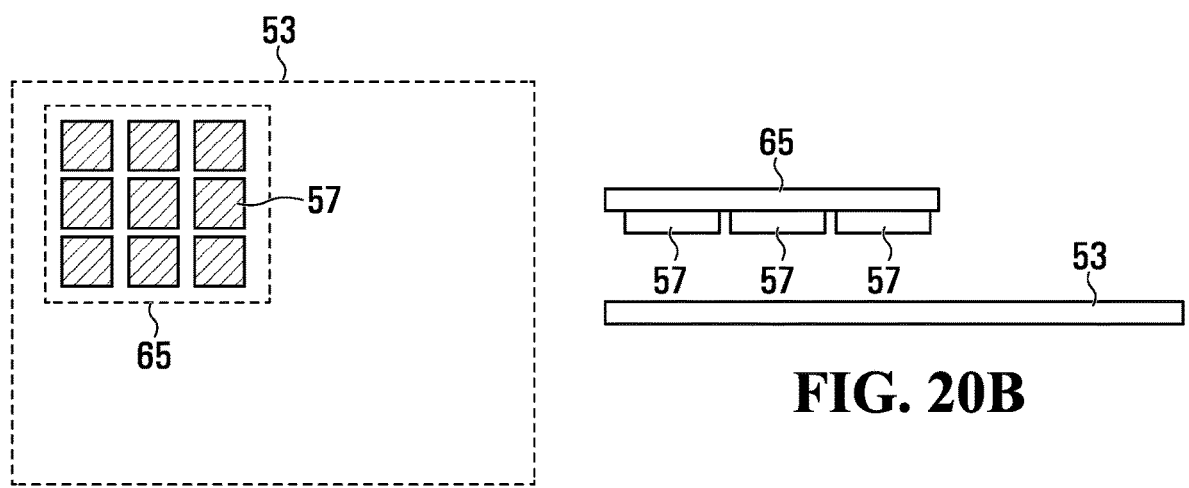
FIG. 20A
FIG. 20B

APPARATUS FOR WIRELESS POWER TRANSMISSION AND METHOD OF USE THEREOF

CROSS-REFERENCE TO RELATED APPLICATIONS

The present application is a continuation of U.S. patent application Ser. No. 17/095,381 with a filing date of Nov. 11, 2020, which claims priority from U.S. provisional patent application No. 63/109,190 filed on Nov. 3, 2020, the contents of which are incorporated herein by reference.

TECHNICAL FIELD

The present disclosure relates to systems and methods for wireless energy transfer, and more particularly to circuit configurations for wireless energy transfer.

BACKGROUND

There are different solutions for providing wireless energy transfer known in the art, where resonant loosely-coupled coils transfer power with magnetic fields in the near field. Several configurations already exist in that application. The most basic configuration consists of one transmitter unit and one receiver unit. The transmitter unit comprises a power source (voltage source or current source) which is connected to a resonator (a capacitor and an inductor in the form of a coil) designed to resonate at a predetermined frequency. The receiver unit typically includes at least a resonator and a load. The load is the object that is to be powered wirelessly. In some examples, the load is typically a mobile device such as a cellphone, a computing device, a lamp, etc.

Some systems detailed in the prior art may include multiple receiver units that are powered wirelessly from the same transmitter unit. These configurations generally have a larger transmitter unit compared to the receivers, such as to be able to power several receiver units at the same time. The more receiver units to be powered, the larger the resonator from the transmitter is required. This correlation effectively results in significant issues for producing large surface areas (e.g. table, desk, floor, etc.) operable to wirelessly power multiple devices at the same time. Some of these issues include a reduction in magnetic coupling between the transmitter and the receivers, detrimental interference in the system due to parasitic elements as the increase in inductance of the transmitter coil leads to significant reduction of the capacitance, a reduction of the magnetic field density at the center of the surface, an increase of the transmitter coil's resistance, an increase in energy radiation as the length of the transmitter coil reaches a significant fraction of the emitted wavelength and a need to have a custom transmitter coil, in dimension and design, for each wireless power surface that differ in size or shape.

A number of solutions to some of the aforementioned issues exist in the prior art. Some have proposed the use of multiple transmitter resonators connected to the same power transmitting unit, extending the charging distance by including repeater resonators between the transmitter unit and the receiver units (whether in-plane or out-of-plane) or reducing the size of the repeater resonator units such that they are relatively small in comparison to the receiver units.

Some of these solutions introduce new issues that may significantly impact the efficiency of power transfer and the use of the system by a user. For example, prior art in-plane repeater resonator systems inserted in furniture typically result in an uneven distribution of power through each repeater, such that some areas of the surface may not transfer enough power to charge a device whereas other areas would (i.e. checkerboard effect). This results in an uneven distribution of power across a surface implementing an array of resonators. A load may therefore not receive power, or receive little power, depending on its position on the surface due to the checkerboard effect. This effect stems from the magnetic coupling between neighboring repeaters (which are also relatively small) and tends to create a frequency split between the coils (due to the excitation of resonant modes and the mutual inductance generated from the neighboring coil). Additionally, this may be exacerbated when using repeater resonators units with the same design parameters (e.g. tuning frequency, trace/cable width and thickness, number of turns, area, number of layers, etc.) and typically becomes worse as the system includes more repeaters, such as would be required to cover a larger surface.

To address this issue, some prior art configurations change the operating frequency of the system or the number of repeater resonators that are functional at a given time as a function of the receiver position. While this may work for certain operating conditions, it becomes increasingly hard for several receiver units to work at the same time as the system may not be able to have a pattern of "activated" repeater resonators that enables all the receiver units to be wirelessly powered at the same time (i.e. it may not be possible to solve the checkerboard effect over the area such that no receiver units is over a dead zone).

An example of this solution is presented in FIG. 1, where a metamaterial 135 with resonators 55 are less efficient at transmitting wireless power at the operating frequency due to the checkerboard effect than resonators 57. As such, the checkerboard effect results in having areas where the received power diminishes, resulting in less effective wireless power transfer at certain locations across a surface where wireless power is supplied by resonators.

In FIG. 2, shutting off resonator 59 may further change the pattern of wireless power transfer efficiency by the resonators of the array of resonators, thus indicating that an array of resonators as known in the art are further prone to variations in the checkerboard effect when a resonator is deactivated intentionally by the user or system, when a resonator fails or when a parasitic element, interfering with the resonance, is present in the vicinity of the resonators. Despite some prior art systems utilizing the change of pattern in the checkerboard when a resonator is shut off to optimize power at a certain location, as explained in WO 2018/229494, the selective activation and inactivation of resonators nonetheless results in an uneven surface for wireless power transmission, where power cannot be wirelessly transmitted therethrough, and is cumbersome to manage as a function of the position of the load on the surface.

None of the aforementioned wireless-power configurations result in a solution providing a uniform surface for wireless power transfer that is scalable to the size of the surface.

SUMMARY

The present disclosure relates to a wireless power delivery system and method(s) of use thereof to uniformize wireless power transfer (WPT) over a wide area using an array of resonators, thereby minimizing the checkerboard effect.

The present disclosure describes a system for minimizing the checkerboard effect by calibrating the resonators of the array of resonators at different tuning frequencies, where not all of the resonators of the array of resonators are set at the operating frequency of the system (e.g. the frequency at which the transmitter resonator emits the wireless power), instead set at individual tuning frequencies in order to optimize the overall transmission of wireless power at the operating frequency of the system. Having the resonators of the array of resonators set at different tuning frequencies from the operating frequency enables the system to minimize the effects of interference, or compensating the electromagnetic interactions, between the resonators of the array of resonators at a given operating frequency, thereby maintaining a transmission of wireless power across the entirety of the surface at the operating frequency. Such may be achieved through the interaction of resonators of the array of resonators, where mutual inductance between neighboring resonators can alter individual resonant frequencies, thereby affecting the pattern of wireless power transfer efficiency as a function of the tuning frequency of each of the resonators of array of resonators (and the relative position of the transmitter resonator and receiver resonator in relation to the array of resonators). The individual tuning frequencies of the resonators can be altered until a desired effective set of resonant frequencies is achieves that optimizes transfer of wireless power at the given operating frequency of the system.

The system may also be used for wireless data transfer, where the data may be propagated from the transmitter resonator, to the array of resonators, then to the receiver resonator, the receiver resonator transferring the data to the device connected to the receiver resonator.

As such, each resonator within the array of resonators may be individually tuned to a predetermined resonant frequency where the individual resonant frequency may be calculated based on the capacitance and inductance of the coil of each resonator unit, and based on the properties of the neighboring resonator(s). This individual tuning frequency can be different from other resonator units of the array and may further be different from the operating frequency of the system.

The wireless power transfer described herein may use non-radiative resonant loosely-coupled coils (also called spirals, spiroids or loop antennas) using magnetic field in the near field.

The present disclosure also relates to a further improvement to a system for reducing the checkerboard effect, which can be implemented in addition, or as a standalone feature, to adjusting the individual tuning frequencies of the resonators of the array of resonators. The system includes connecting the resonators of the array of resonators through a modified connection, whereby the modified connection is a wired connection between all the resonators in the array of resonators or a strong electromagnetic field coupling between all the resonators in the array of resonators. The modified connections dwarf the losses resulting from the interference, thereby limiting the checkerboard effect of the array of resonators.

A broad aspect is a wireless power transfer apparatus for providing wireless power within a defined boundary to a device to be placed on a surface associated with an array of resonators within the defined boundary. The apparatus includes the array of resonators; a powered resonator for providing power through electromagnetic resonance to the array of resonators, wherein the powered resonator is powered at an operating frequency, wherein the powered resonator is one of: an external resonator for powering the array of resonators from above or below the array of resonators; and one of the array of resonators; wherein the resonators transfer power from the powered resonator to any one of the array of resonators for delivering wireless power to the device by one of or a combination of: a modified connection between the resonators of the array of resonators except the powered resonator; and wireless weak electromagnetic field coupling between neighboring resonators of the array of resonators each having a tuning frequency of resonance wherein the array of resonators has at least two distinct tuning frequencies from all the resonators constituting the array of resonators; wherein the modified connection is one of or a combination of: a wired connection between all the resonators in the array of resonators; and a strong electromagnetic field coupling between all the resonators in the array of resonators, wherein the strong electromagnetic field coupling is one of or a combination of: a specific positioning of the resonators in the array of resonators; and a use of intermediary components that have a strong internal electromagnetic field coupling and have at least two ports with each of the ports being connected to a different resonator of the array of resonators.

In some embodiments, the resonators may transfer power from the powered resonator to one or more resonators of the array of resonators for delivering wireless power to the device by the wireless weak electromagnetic field coupling between neighboring resonators of the array of resonators each having a tuning frequency of resonance wherein the array of resonators may have at least two distinct tuning frequencies from all the resonators constituting the array of resonators.

In some embodiments, each resonator of the array of resonators may have a different tuning frequency with respect to one another.

In some embodiments, the resonators of the array of resonators may be adjacent to one another and positioned within a plane.

In some embodiments, at least some resonators of the array of resonators may be positioned at an angle with respect to one another or are positioned on different parallel planes.

In some embodiments, the surface may be curved.

In some embodiments, coupling coefficients between a wireless power receiver of the device and a resonator of the array of resonators may not be equal for different resonators of the array of resonators.

In some embodiments, coupling coefficients between the powered resonator and a resonator of the array of resonators may not be equal for different resonators of the array of resonators.

In some embodiments, a coupling coefficient between a wireless power receiver and the power resonator may be different from coupling coefficients between the wireless power receiver and each of the resonators of the array of resonators.

In some embodiments, dimensions of a resonator of the array of resonators may be greater than dimensions of the power resonator.

In some embodiments, dimensions of a resonator of the array of resonators may be smaller than dimensions of the power resonator.

In some embodiments, the powered resonator may be an external resonator for powering the array of resonators from above or below the array of resonators.

In some embodiments, the resonators may transfer power from the powered resonator to any one of the array of resonators for delivering wireless power to the device by a modified connection between the array of resonators except the powered resonator.

In some embodiments, the modified connection may be the wired connection between all the resonators in the array of resonators.

In some embodiments, the resonators in the array of resonators may be connected in series or in parallel.

In some embodiments, the resonators in the array of resonators may be connected in anti-series or in anti-parallel.

In some embodiments, the modified connection may be a strong electromagnetic field coupling between all the resonators in the array of resonators.

In some embodiments, the strong electromagnetic field coupling may be a specific positioning of the resonators in the array of resonators.

In some embodiments, the specific positioning of the resonators in the array of resonators may be increasing or decreasing distance between the resonators of the array of resonators.

In some embodiments, the strong electromagnetic field coupling may be a use of intermediary components that have a strong internal electromagnetic field coupling and have at least two ports with each of the ports being connected to a different resonator of the array of resonators.

In some embodiments, the apparatus may include intermediary components that have at least two ports, wherein at least one of the ports may not be connected to a resonator of the array of resonators, resulting in an edge condition of the array of resonators to be continuous.

In some embodiments, each resonator of the array of resonators may be internally connected in series; and/or each resonator of the array of resonators may be internally connected in parallel.

In some embodiments, some of the resonators of the array of resonators may be internally connected in series and other resonators of the array of resonators may be internally connected in parallel.

In some embodiments, the array of resonators may include four or more resonators and wherein the four or more resonators may be positioned as at least a 2 by 2 matrix.

In some embodiments, the resonators of the array of resonators may be of different dimensions.

In some embodiments, the resonators of the array of resonators may have different shapes.

In some embodiments, the resonators of the array of resonators may be modular.

In some embodiments, the array of resonators may be adapted to be coupled to the powered resonator.

In some embodiments, the powered resonator and the array of resonators may be embedded in a substrate.

In some embodiments, the apparatus may include a wireless power receiver for providing power to the device, wherein the wireless power receiver may be embedded in the device.

In some embodiments, the apparatus may include one or more of: a plurality of the powered resonators; a plurality of the receiver resonators; one or a plurality of repeater resonators that are not positioned in the array of resonators; and a plurality of the array of resonators.

In some embodiments, the array of resonators may have an internal or external adaptive reactance or wherein the resonators of the array of resonators may have an internal or external adaptive reactance.

In some embodiments, the array of resonators may improve one or more characteristics provided by a metamaterial selected from: a change in direction of an electromagnetic field; a focusing of an electromagnetic field; a defocusing of an electromagnetic field; an increase in electromagnetic isolation of a component from its environment; and an increase in electromagnetic field coupling between two or more electromagnetic components.

In some embodiments, the array of resonators may be used in the context of electromagnetic wave propagation.

In some embodiments, the resonators may transfer power from the powered resonator to any one of the array of resonators for delivering wireless power to the device by the modified connection and the resonators of the array of resonators may be repeater resonators that have all the same tuning frequency that is different than the operating frequency.

In some embodiments, the wireless power transfer may be used for transfer of data contained within a wirelessly transferred wave between the powered resonator, the array of resonators and a receiver resonator of the device.

In some embodiments, at least one of reactance, inductance and capacitance of one or more of the resonators of the array resonators may be adaptive, or at least one of reactance, inductance and capacitance of the array of resonators may be adaptive, wherein the array of resonators may not lose functionality at the operating frequency when one or more resonators of the array of resonators is cut, deactivated or electromagnetically interfered with.

In some embodiments, the resonators of the array of resonators may be integrated into a floor, a ceiling or a wall.

Another broad aspect is furniture comprising the apparatus as described herein, wherein the array of resonators is joined to a flat surface of the furniture.

In some embodiments, the furniture may be a table.

Another broad aspect is a method of providing wireless power within a defined boundary to a device to be placed on a surface within the defined boundary. The method includes receiving wireless power at a receiving frequency from a resonator that provides power through electromagnetic resonance to an array of resonators of two or more resonators, wherein the array of resonators has at least two distinct tuning frequencies from all the resonators constituting the array of resonators; and transmitting with the array of resonators wireless power at an operating frequency to the device placed on a surface to wirelessly power the device.

In some embodiments, the operating frequency may be different from tuning frequencies of the at least two distinct tuning frequencies.

In some embodiments, the array of resonators may improve an increase in magnetic field coupling provided by a metamaterial.

Another broad aspect is a method of providing wireless power within a defined boundary to a device to be placed on a surface within the defined boundary. The method includes receiving wireless power from a powered resonator that provides power through electromagnetic resonance to an array of resonators of two or more resonators; transferring power from the powered resonator to any one of the array of resonators for delivering wireless power to the device by a modified connection between the array of resonators except the powered resonator, wherein the modified connection is one of or a combination of a wired connection between the resonators in the array of resonators, and a strong electromagnetic field coupling between the resonators in the array of resonators; and transmitting with the array of resonators wireless power to the device placed on a surface to wireless power the device.

In some embodiments, the modified connection may be the wired connection between all the resonators in the array of resonators.

In some embodiments, the modified connection may be the strong electromagnetic field coupling between all the resonators in the array of resonators.

In some embodiments, the array of resonators may improve an increase in magnetic field coupling provided by a metamaterial.

In some embodiments, the strong electromagnetic field coupling may be one of or a combination of: a specific positioning of the resonators in the array of resonators; and a use of intermediary components that have a strong internal electromagnetic field coupling and have at least two ports with each of the ports being connected to a different resonator of the array of resonators.

In some embodiments, the strong electromagnetic field coupling may be the use of intermediary components that have a strong internal electromagnetic field coupling and have at least two ports with each of the ports being connected to a different resonator of the array of resonators, wherein the intermediary components may be at least one of capacitive metal plates, flat coils, a capacitor and a transformer.

BRIEF DESCRIPTION OF THE DRAWINGS

The invention will be better understood by way of the following detailed description of embodiments of the invention with reference to the appended drawings, in which:

FIG. 19 is a schematic of an array of repeater resonators, a transmitter resonator and a receiver resonator, showing the coupling interactions between the inductors of the resonators;

FIGS. 20A and 20B are schematics of an array of resonators, a receiver resonator and a transmitter resonator of different sizes;

DETAILED DESCRIPTION

Figure 1:
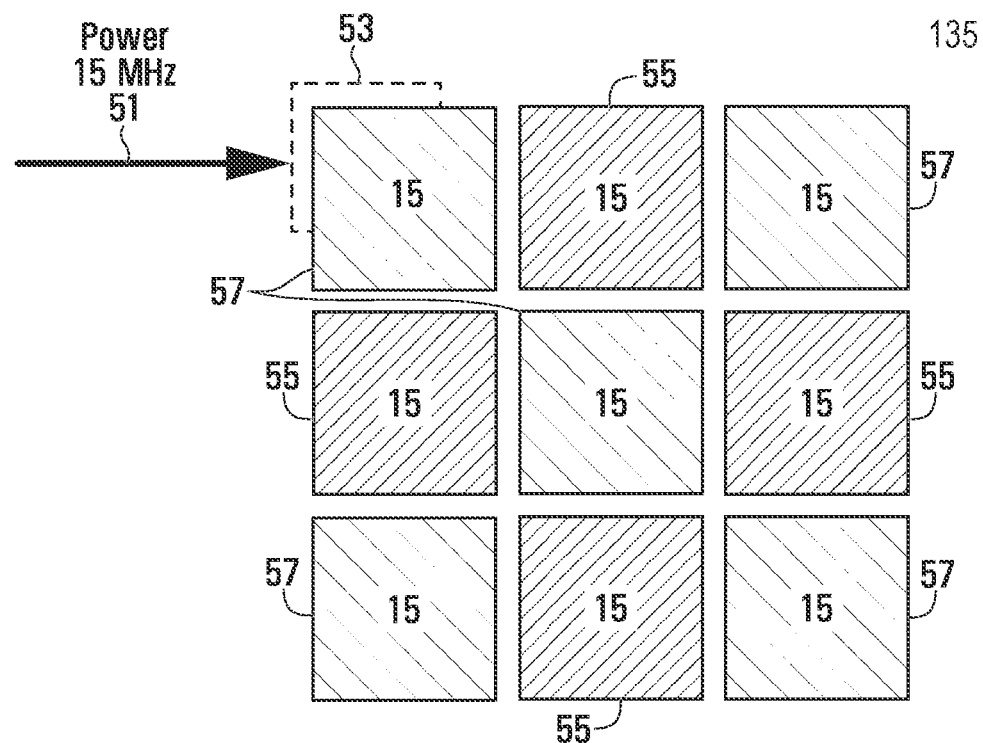
FIG. 1 is a schematic of a prior art wireless power resonator array illustrating a non-optimal embodiment that has a significant checkerboard effect, in which some resonators do not transfer power efficiently (depending on the receiver resonator position above the resonators of the array of resonators)
Figure 2:
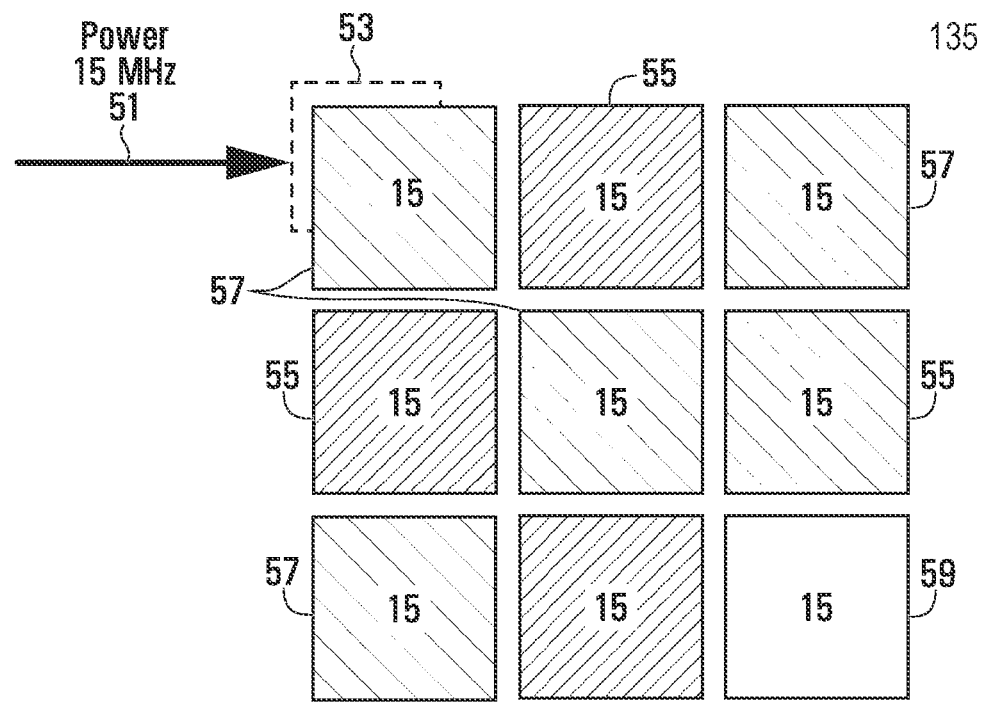
FIG. 2 is a schematic of the prior art wireless power resonator array of FIG. 1 where a resonator is further disconnected to modify the checkerboard pattern such that power can be transferred more efficiently from the transmitter resonator to the receiver resonator (depending on the receiver resonator position above the active resonators of the array of resonators)

The present disclosure relates to a system for improving wireless power across a surface, where the surface is adapted with an array of resonators for transmitting the wireless power from a power source. The surface may be that of furniture, such as a table, a counter, a cupboard, etc. The surface may also be that of a floor, a wall, a curved sculpture, etc.

The system of the present disclosure addresses the problem of the checkerboard effect that affects an array of closely-positioned resonators, forming an array of resonators. The interference between neighboring resonators creates areas across the surface that do not receive wireless power or that receive a diminished amount of wireless power, and where wirelessly charging a load is difficult if not impossible due to the checkerboard effect.

In one aspect, in order to remedy the disadvantages of the checkerboard effect, the present system includes an array of repeater resonators where two or more of the repeater resonators may have a different tuning frequency.

For a defined array size (defined by the number of resonator units for the width and the length of the array) and repeater resonator unit coil, it is possible to remove the checkerboard effect by adjusting the tuning frequency of individual repeater resonator units of the array. This different tuning frequency may be achieved by changing the capacitance value (e.g. from a capacitor) or the inductance value (e.g. from an inductor) of each resonator unit of the array of resonators depending on its position within the array. By doing so, when each resonator unit is placed within the array, the placement of the resonator shifts their respective optimized resonant tuning frequency (because of the magnetic coupling with its neighbor units) to the system operating frequency, thereby resulting in relatively uniform transmission of wireless power across the surface defined by the array of resonators. This makes the system more reproducible and enables the charging of any number of loads at the same time at different positions on a surface defined by the array of resonators.

Another aspect presented herein to overcome the checkerboard effect is to connect the resonators of the array of resonators through a modified connection. The modified connection may be achieved through a wired connection between the resonators of the array of repeater resonators. The connection may be achieved through an electromagnetic connection (e.g. using transformers and/or capacitors as described herein).

The checkerboard effect may also be minimized through a modified connection that also increases the distance between each of the resonators of the array of resonators. The increase in distance reduces the interference between the resonators and the checkerboard effect.

It is understood that any combination of the different aspects of the system of the present disclosure may be present. The present disclosure may be applied to any kind of resonator array (e.g. a repeater resonator array, a transmitter resonator array, a receiver resonator array, a metamaterial, etc.) for any kind of purpose (e.g. for extending the charging area, for augmenting the magnetic coupling factor or other case of resonator array, etc.) that can be used for an application such as wireless power transfer, photonics or other.

Figure 16:
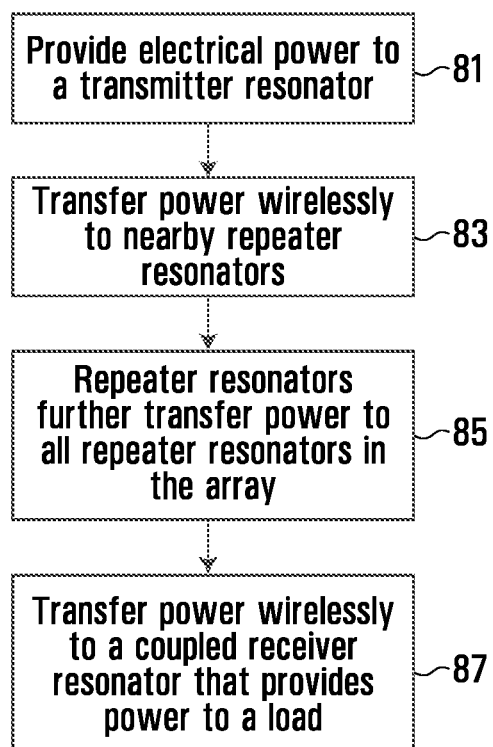
FIG. 16 is a flowchart of an exemplary process of wirelessly transferring power from a transmitter resonator to an array of repeater resonators that then transfers the wireless power to a receiver resonator.

With reference to FIG. 16, an exemplary apparatus of the present disclosure includes the transmitter unit (comprising a RF power amplifier and a transmitter resonator), the array of resonators, and the receiver unit (comprising a receiver resonator and a resistive load) that provides power to the load.

Electrical power is provided to the transmitter resonator at step 81. The electrical power may be provided wirelessly or through a wired connection (e.g. through a cable joined to a wall socket). An AC/DC power converter may also be present to generate alternating current at a given frequency prior to wireless transmission by the transmitter resonator.

The transmitter resonator then transfers wireless power to the repeater resonators of the array of repeater resonators at step 83. The transmitter resonator may be part of the array of repeater resonators, or may be a distinct component, positioned under, above or next to the array of repeater resonators.

The repeater resonators may further transfer wireless power to the nearby repeater resonators of the array of repeater resonators at step 85, thereby resulting in an array of resonators propagating wireless power across the surface defined by the array of repeater resonators.

The repeater resonators of the array of repeater resonators then transfer power wirelessly to the receiving resonator unit, connected to the load at step 87, thereby providing power to the load.

Definitions

Figure 14A:
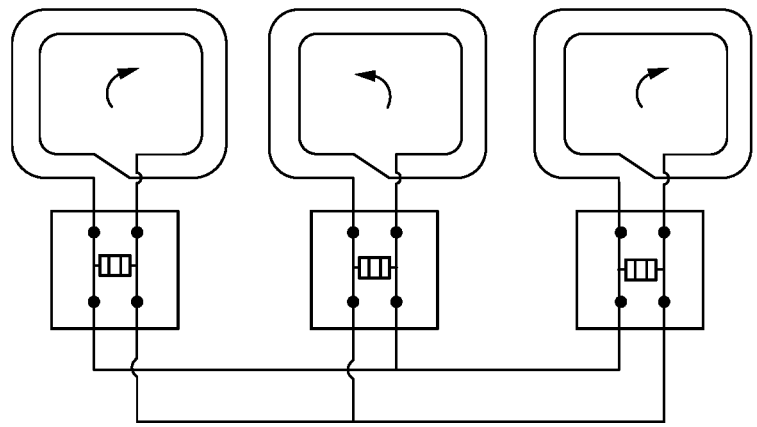
FIGS. 14A-14B are schematics of an exemplary resonator array with modified connections via wires.
Figure 14B:
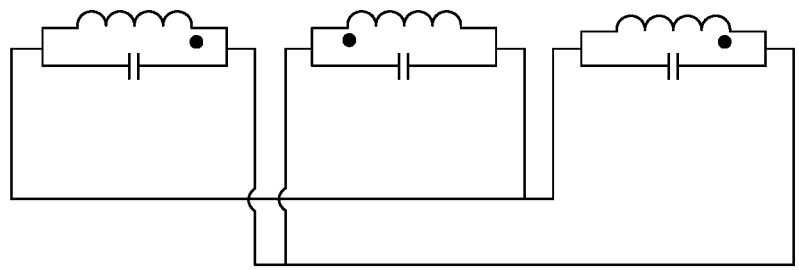

By an "array of resonators", it is meant two resonators or more that are arranged in proximity to one another to provide wireless power across a surface defined by the specifications of the array. In the case the resonators of the array are interconnected with one another with a modified connection, they may further be configured to have each of those interconnections in parallel, in anti-parallel, in series, in anti-series, or a combination thereof. Each resonator within the array of resonators may have its components (inductor, capacitor) arranged in series, or parallel. For instance, reference is made to FIGS. 14A and 14B, illustrating an exemplary array of resonators having a modified connection with wires, where the repeaters are connected in anti-parallel, where the coils are laid out such that they coil in alternated directions. Exemplary configurations of an array of resonators are illustrated in FIGS. 25A-H. The number of resonators present in the array may vary (e.g. more than 3, 100, etc.), and the dimensions, matrix (e.g. 2×2; 10×10; 4×8; not a defined shape of matrix, etc.), the type of modified connection, if any, and configurations of the array of resonators may also vary. The size of the resonators within the array of resonators may also vary, where the resonators may be joined to or encased in a substrate, resulting in a tile that can easily be positioned next to other tiles enclosing or including resonator components. The resonators of the array of resonators may be placed adjacent to one another, at angle with respect to one another (e.g. in order to cover a curved surface), or on different parallel planes.

By "checkerboard effect", it is meant the effect where there are multiple resonators that are electromagnetically coupled to one another in such a way that the efficiency of wireless power transfer is significantly not uniform depending on which of the resonator from the multiple resonators transfers wireless power. Some of the reasons explaining this phenomenon are electromagnetic coupling between multiple resonators, the frequency splitting and the different resonant modes of the system of multiple resonators. The frequency splitting mean that a resonator has more than one resonant frequency at which it has a maximum in the efficiency of wireless power transfer. The expression "resonant modes" means that a system with multiple resonators that interact with one another electromagnetically can create different patterns of efficiency of wireless power transfer within the system depending on the operating frequency. Typically, the phenomenon of the checkerboard effect arises from multiple resonator put side by side on relatively the same plane. A possible synonym is a "checkerboard pattern".

By "operating frequency", it is meant the frequency at which the system is set to emit wireless power, where a load connected to a receiver resonator can be wirelessly powered by the system, by that operating frequency.

Figure 13:
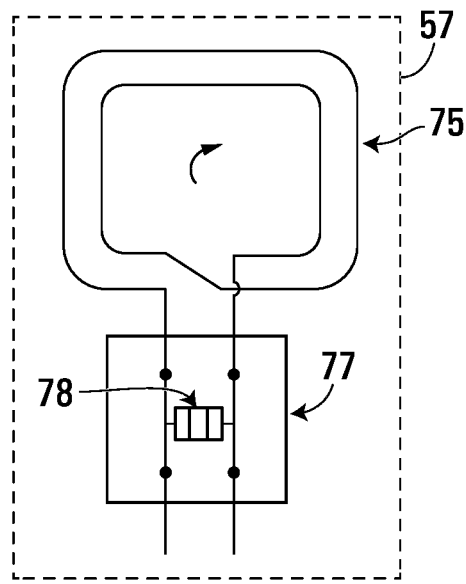
FIG. 13 is a schematic of an exemplary resonator structure.

By "resonator", it is meant an apparatus adapted to receive and transmit wireless power, the resonator including an inductance value and a capacitance value (e.g. the inductance value can come from a coil, a spiroid and/or an inductor, the capacitance value can come from a discrete capacitor and/or from parasitic capacitance). Those capacitance and inductance values can be fixed or variable. The resonator may have its components (inductance, capacitance) arranged in series or in parallel. For instance, as shown in FIG. 13, the resonator may include a coil 75 (e.g. made from a wire) joined to a printed circuit board 77 (including a capacitor, item 78), where the coil 75 and the printed circuit board 77 are joined together to form a resonator 57. The resonators may be joined to a substrate or embedded in a material. It will be understood that the relative size of the items in FIG. 13 is for illustrative purposes and the relative size and proportions do not necessarily represent the size and proportions of a real system (an example of a real resonator using wireless power transfer in the near field with the magnetic field may have a small printed circuit board 77 and small capacitor 78 when compared to the flat coil 75). By "strong electromagnetic coupling", it is meant the coupling between two resonators that interact strongly with one another through an electromagnetic field (i.e. through the electric field and/or the magnetic field). This electromagnetic coupling is a dimensionless value describing the mutual capacitance and/or inductance that components impart to another. Strong coupling is when most of the electromagnetic field (or flux) from one of the resonators goes through the second resonator. This means that the magnetic or electric field coupling is more than 0.5 ($K_{ij} \geq 0.5$). The typical value obtained in different designs, for wireless power transfer or otherwise, is of 0.7 or more. Synonyms are tight coupling, strong inductive coupling, strong capacitive coupling, strong magnetic field coupling and strong electric field coupling.

By "Weak electromagnetic coupling", it is meant the coupling between two resonators that interact weakly with one another through an electromagnetic field (i.e. through the electric field and/or the magnetic field). This electromagnetic coupling is a dimensionless value describing the mutual capacitance and/or inductance that a component does to another. Weak coupling is when most of the electromagnetic field (or flux) from one of the resonators does not go through the second resonator. This means that the magnetic and/or electric field coupling is less than 0.5 ($K_{ij} \leq 0.5$). The typical value obtained in different designs, for wireless power transfer or otherwise, is of 0.3 or less. Synonyms are loose coupling, weak inductive coupling, weak capacitive coupling, weak magnetic field coupling and weak electric field coupling.

By "tuning frequency", it is meant the frequency at which any individual resonator is tuned. It is defined by the resonant frequency of a resonator in an environment without electromagnetic interference (the resonator is alone and not influenced by other electromagnetic objects). This tuning frequency is further calculated by using the capacitance value (C) and inductance value (L) of a resonator by the equation:

$$f = \frac{1}{2\pi\sqrt{LC}}$$

If a resonator is not influenced by its environment, it would resonate at the tuning frequency. In a real application where there are other electromagnetic objects in the vicinity of the resonator in question, the resonator can resonate at other frequencies. This may be due to the electromagnetic couplings (and the mutual inductance and/or capacitance values), the different resonant modes of a system of multiple resonators and the frequency splitting, where the frequency of resonance of the resonator at which the resonator is the most efficient to transfer wireless power can differ significatively from the tuning frequency.

This tuning frequency is in contrast with the operating frequency of the system which is the frequency at which the power is sent wirelessly.

By "anti-series", it is meant two or more components that are connected to one another in series but with their polarity reversed. In the case of resonators or inductances (e.g. from coils) that interact electromagnetically with one another, a topology where the components are connected in anti-series makes those components have a differentially (subtraction) coupled electromagnetic field (if the coupling coefficient is positive, i.e. $K_{ij}>0$). This is in contrast to the same kind of components that are connected in series instead which makes those components have a cumulatively (addition) coupled electromagnetic field (if the coupling coefficient is positive, i.e. $K_{ij}>0$). In the case where the components do not have any polarity, anti-series and series become the same thing. Possible synonyms are antiseries, anti-serial, inverse-series, series with reversed polarity, reverse polarity series.

By "anti-parallel", it is meant two or more components that are connected to one another in parallel but with their polarity reversed. In the case of resonators or inductances (e.g. from coils) that interact electromagnetically with one another, a topology where the components are connected in anti-parallel makes those components have a differentially (subtraction) coupled electromagnetic field (if the coupling coefficient is positive, i.e. $K_{ij}>0$). This is in contrast to the same kind of components that are connected in parallel instead which makes those components have a cumulatively (addition) coupled electromagnetic field (if the coupling coefficient is positive, i.e. $K_{ij}>0$). In the case where the components do not have any polarity, anti-parallel and parallel become the same thing. Possible synonyms are antiparallel, inverse-parallel, parallel with reversed polarity, reverse polarity parallel.

In the present disclosure, by "metamaterial", it is meant an engineered/artificial structure (building block of the metamaterial) that is designed in such a way to have global properties (macroscopic) of a negative refraction-index, and which are not a result of intrinsic properties of the material. The macroscopic parameters or electromagnetic properties of a metamaterial can be described using the permittivity ($\in$), permeability ($\mu$) and the chirality ($\kappa$).

For the structure to be a metamaterial, the structure displays global properties of negative permeability ($\in<0$) and of negative permittivity ($\mu<0$). Normally, to achieve those properties, the building blocks are significantly smaller than the wavelength (typically 10 times smaller or more). More specifically, in the application of wireless power transfer in the near-field, since the electric and magnetic field are dissociated and one of those fields can dominate the other, a metamaterial can be achieved by having either a negative permittivity (that can be called an electric metamaterial) or a negative permeability (that can be called a magnetic metamaterial). This in contrast with having both of the properties at the same time. Furthermore, since there is a preferential direction for the propagation of the field (especially in near-field), a metamaterial can be achieved through structures in a plane that make a directional or anisotropic metamaterial (in contrast to an isotropic metamaterial where the building blocks need to be in three dimensions or in different orthogonal planes).

Typically, in wireless power transfer, the metamaterial is made with a specially designed resonator array made out of copper. A metamaterial can be used to enhance/augment the electromagnetic coupling, enhance/augment the efficiency of wireless power transfer, change the directions or shape of the electromagnetic flux between resonators, coils or metal plates, amplify evanescent waves or wave propagation, etc. Possible synonyms are super lens, resonator array (in some case), coil array (in some case), magnetic metamaterial, electric metamaterial or single-negative metamaterial, isotropic metamaterial or anisotropic metamaterial.

Figure 3:
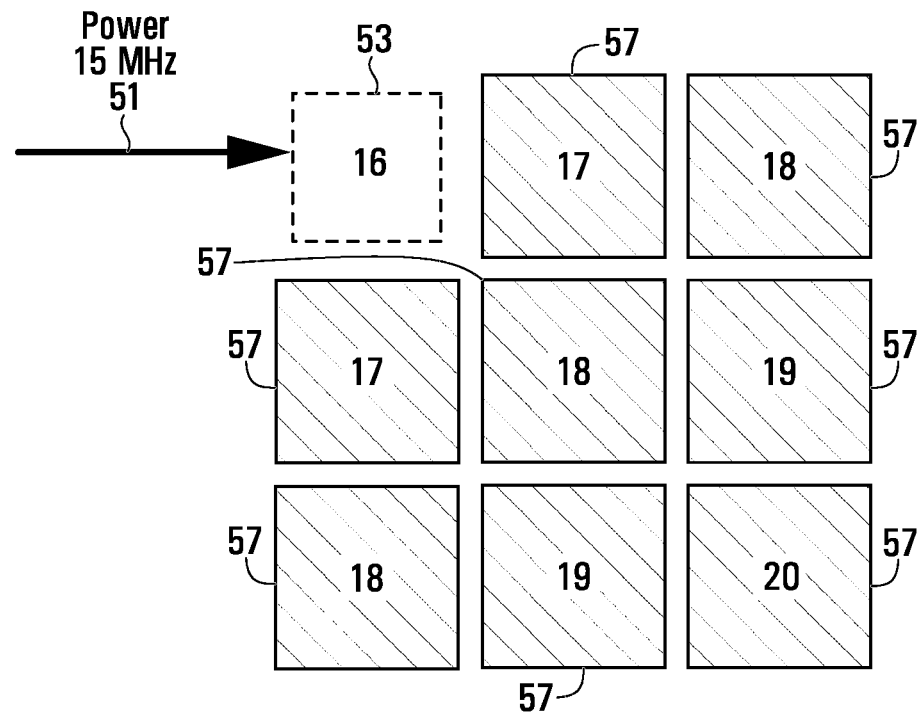
FIG. 3 is a schematic of an exemplary wireless power resonator array in which some resonators have a different resonant frequency and the transmitter resonator is within the array of resonators.

System for Minimizing the Checkerboard Effect Through the Use of Different Tuning Frequencies:

Reference is now made to FIG. 3, illustrating an exemplary system for transmitting wireless power including an array of resonators, where the resonators are set at two or more different tuning frequencies.

The system of FIG. 3 is set at an exemplary operating frequency of 15 MHz, also receiving power 51 (wired) at 15 MHz.

The system receives power at the transmitter resonator 53, which is in the array of resonators. Each of the resonators 53 and 57 is set at individual tuning frequencies, where some of the tuning frequencies differs between resonators (e.g. 16, 17, 18, 19 or 20 MHz—these numbers are presented simply for the purpose of illustration). The skilled person would readily understand that these frequency values are but examples for the purpose of illustration.

The setting of the individual tuning frequencies of each of the resonators can be determined based on the position of the resonator within the array of resonators, the number of resonators in the array, the pattern of the resonator array, the distance between the resonators, the capacitance and inductance values of each resonator, the operating frequency of the system, the electromagnetic interfering elements in the environment where the resonator array will be in use, etc.

FIG. 3 shows the transmitter resonator 53 being part of the resonator array, but a skilled person would readily understand that transmitter resonator 53 (or multiple transmitter resonators) and/or the receiver resonator 65 (or multiple receiver resonators) may be part of the resonator array or be outside the resonator array, without departing from the present teachings. Similarly, the tuning frequency of the transmitter resonator 53 (or multiple transmitter resonators) and the tuning frequency of the receiver resonator 65 (or multiple receiver resonators) can be the same, or different, as the operating frequency of the system without departing from the present teachings.

Figure 4:
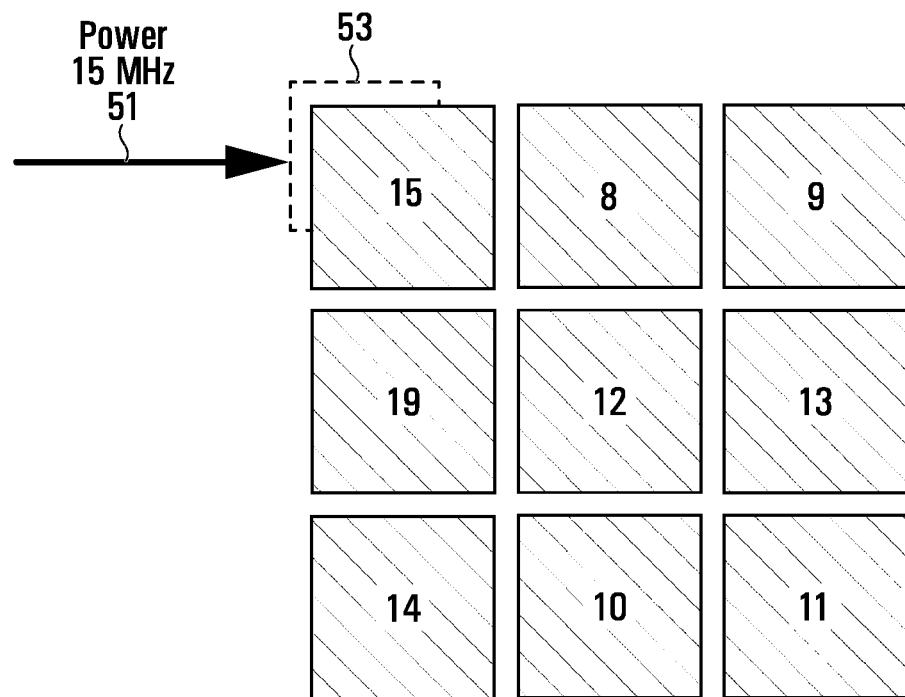
FIG. 4 is a schematic of an exemplary wireless power resonator array in which all resonators have a different resonant frequency.

FIG. 4 provides another example of a system where the resonators of the array of resonators are all set at different tuning frequencies, including at a frequency that can be different from the operating frequency of the system.

For instance, each of the resonators 57 of the system of FIG. 4 is set at a tuning frequency of either 8, 9, 10, 11, 12, 13, 14, 15 and 19 MHz—these numbers are presented simply for the purpose of illustration. The skilled person would readily understand that these frequency values are but examples for the purpose of illustration.

The operating frequency of the exemplary system of FIG. 4 is 15 MHz, and the system of FIG. 4 receives power at 15 MHz. It will be understood that the operating frequency of the system may be set as a function of its purpose.

Moreover, further adapting the tuning frequencies of the resonators of the array of resonators of the present system allows the system to adjust (after the adaptation of tuning frequencies) to the deactivation (e.g. if a resonator is deactivated on purpose, if there is electromagnetic interfering element in the environment of the resonator array, when one resonator fails, etc.) of one of the resonators of the array of resonators, while maximizing the surface area where wireless transmission is possible despite the deactivation of the resonator.

Figure 5:
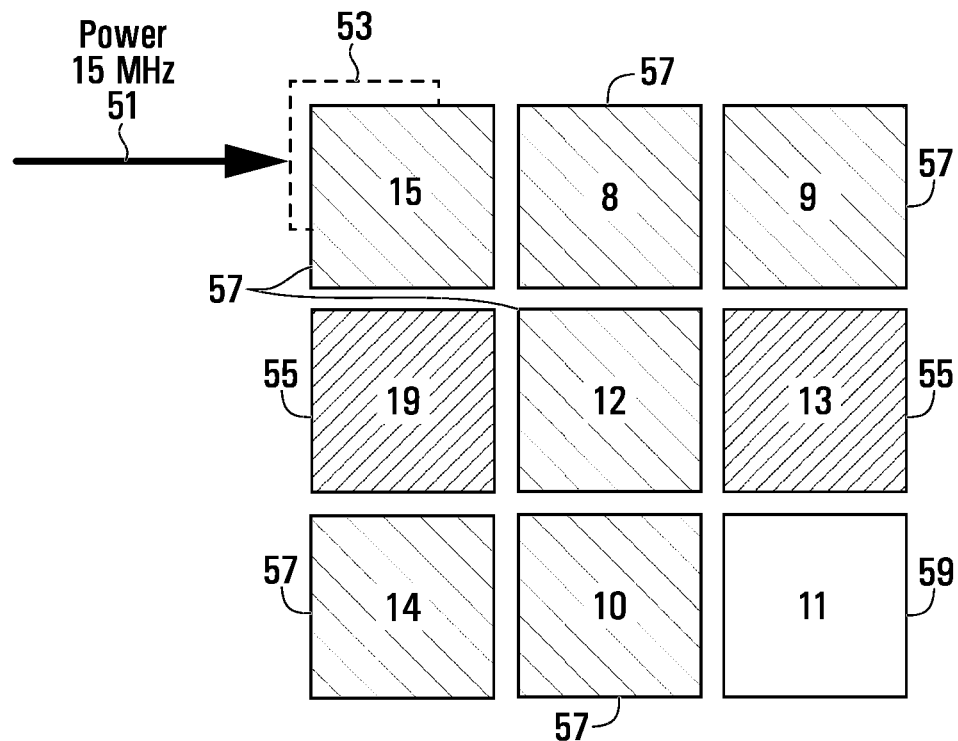
FIG. 5 is a schematic of the exemplary wireless power resonator array of FIG. 4 where one of the resonators has been disconnected, illustrating the effect of the disconnected resonator on the array of resonators each having a different resonant frequency.

Reference is made to FIG. 5, illustrating the exemplary array of resonators, of FIG. 4, where a resonator 59 of the array is disactivated. In this example, the change in the interference caused by the deactivation of resonator 59 results in a different interference pattern for the resonators 57, affecting the wireless power transfer efficiency at the operating frequency of 15 MHz, where some resonators 55 of the array of resonators become significantly less efficient at transferring the wireless power thus creating a checkerboard pattern. As such, the surface corresponding to the array of resonators will suffer from areas where less wireless power is conveyed.

Figure 6:
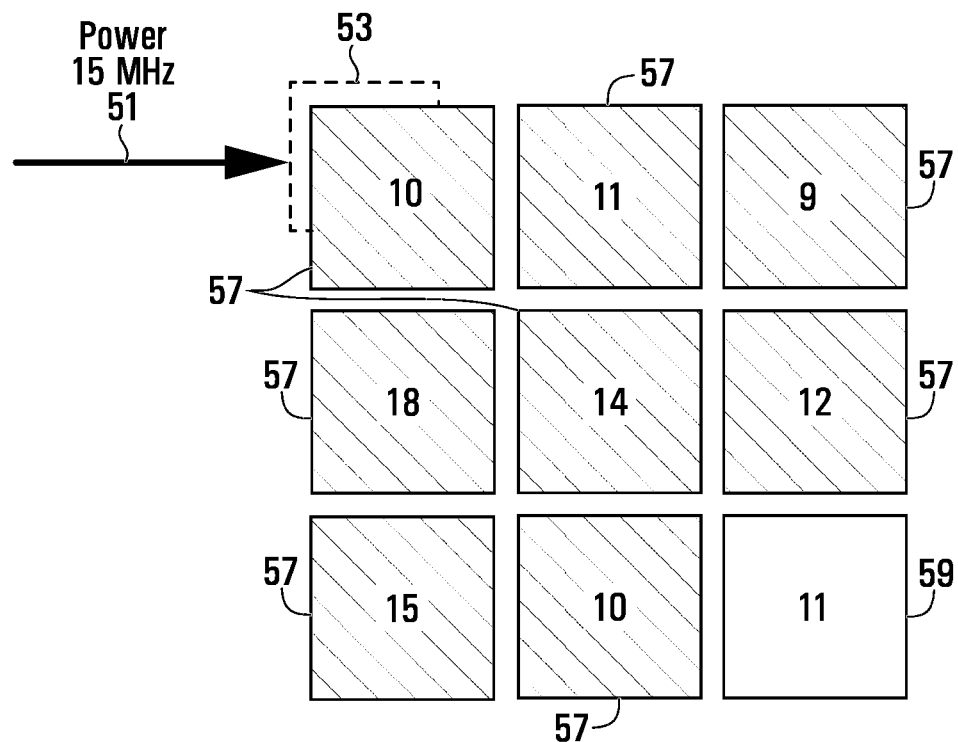
FIG. 6 is a schematic of an exemplary wireless power transfer resonator array illustrating exemplary adjustments to the tuning resonant frequency of the resonators within the array of resonators to counter the checkerboard effect induced by a disconnected resonator of FIG. 5.

In response, as illustrated in FIG. 6, the individual tuning frequencies of each of the functional resonators of the array of resonators can be readjusted to compensate for the loss of resonator 59. As shown in FIG. 6, the tuning frequencies of each of the active resonators is readjusted (from the tuning frequencies of the exemplary embodiment of FIG. 5), resulting in a reduction in negative interference despite the failure of resonator 59, optimizing wireless power transfer at the operating frequency of 15 MHz. As such, readjusting the tuning frequencies of the resonators based on the new configuration of the array of resonators resulting from the loss of resonator 59 reduces the impact of the checkerboard effect within the new resonator configuration. The array of resonators 57 may have internal components, or an external adaptative tuning module, for allowing for the readjustment of the tuning frequencies of the resonators 57, as explained herein (e.g. see FIGS. 23A-E and 24A-B).

In some embodiments, the transmitter, receiver and repeater resonators may have individual tuning frequencies different from the operation frequency of the system, but when they are combined to form the system, their more efficient frequency for wireless power transfer becomes the one of the system. This sometimes results in smaller peak efficiency for the most efficient position on the whole array of resonators, but the efficiency is more uniform between all the possible positions of the transmitter, receiver or repeater relatively to the array of resonators and achieves at least a reduction of the checkerboard effect.

In opposition to an array of repeater resonators that is significantly larger than the transmitter or receiver resonators and that is used to increase the wireless power transfer area (a typical embodiment of this type of repeater array is where the array is static and the transmitter and/or receiver resonators move), there is also the possibility to use a repeater resonator or a repeater resonator array attached (in proximity) to the transmitter resonator or receiver resonator (this repeater resonator or repeater resonator array does not move relative to the transmitter or receiver unit) in order to effectively increase the magnetic coupling between some of the resonators. In this example, an individual tuning frequency different from the system operating frequency can be used to further enhance the magnetic coupling between the resonators and/or to maximize the efficiency of wireless power transfer. A skilled person in the art would thus understand that the present teachings are also applicable to a metamaterial.

In some embodiments, as shown in FIGS. 19, 26A-B and 27A-B, the coupling coefficients between the inductances of the repeater resonators, receiver resonator and transmitter resonator may differ. The coupling coefficient between each of the resonators of the array of resonators and the transmitter resonator may not be equal. The coupling coefficient between each of the resonators of the array of resonators and the receiver resonator may not be equal. It will be understood that the transmitter resonator 53 and the receiver resonator 65 may be placed anywhere along the surface (and above or below the surface) covered by the array of resonators.

System for Minimizing the Checkerboard Effect Through the Use of Modified Connections Between Resonators:

The present system can also minimize the checkerboard effect by connecting the resonators of the array of resonators through a modified connection. The modified connection may be a wired connection or a strong electromagnetic field coupling connection.

The use of the modified connection can be added in combination with the individual adjusting of the tuning frequencies of the resonators of the array of resonators, or may be provided on its own to reduce the checkerboard effect.

This modified connection is applicable to a repeater resonator array that is intended to increase the wireless power transfer area or to an array of resonators intended to increase the magnetic coupling between two resonators (generally attached to a transmitter unit or a receiver unit, and frequently referred to as metamaterials). These electrical topologies consist of two main categories: direct connections, with cables, or indirect connections, with an electromagnetic field coupling, between the repeater resonators of the array. Within those two main categories, each individual resonator can have its inductance and capacitance connected in series or in parallel.

These different configurations (the main categories and their respective sub-categories) can significantly reduce the checkerboard effect since the energy transfer is greatly coupled between the resonators of the array, because of the modified connection, and dwarf the influence of negative interference between resonators. Furthermore, those configurations enable a broader bandwidth range for efficient wireless power transfer, aligning more strongly the central frequency of efficient wireless power transfer between one receiver resonator position to another position, simplifying the simulation (due to the small electromagnetic coupling of the side by side resonators, the relative influence on the overall system decreases). Moreover, the peak efficiency of wireless power transfer increases in general with those electrical topologies since the power has a more direct power transfer path within the repeater resonator array compared to a conventional repeater array where each individual unit is simply loosely-coupled to another.

Figure 15A:
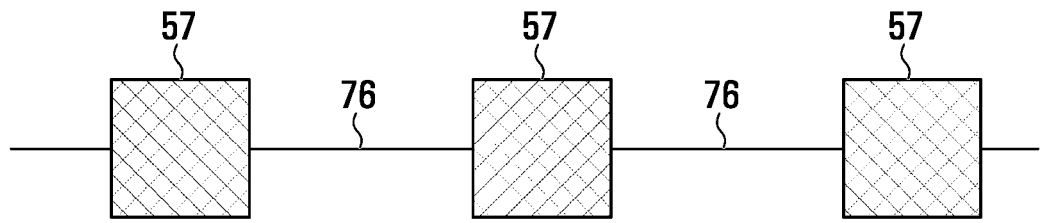
FIG. 15A is a schematic of an exemplary resonator array with modified connections via wires.

The main category of direct connection (with cables), as shown in FIG. 15A, between the resonator units of the repeater resonator array can be further divided into 4 sub-categories. These are: connecting the resonator units with one another in series, anti-series, parallel or anti-parallel. The sub-categories of parallel and anti-parallel can be seen as making each resonator unit of the array an independent LC tank circuit that is strongly connected to others. The 4 sub-categories combined with the 2 possible configurations of each individual resonator unit bring a total of 8 configurations within the main category of direct connection.

Figure 15B:
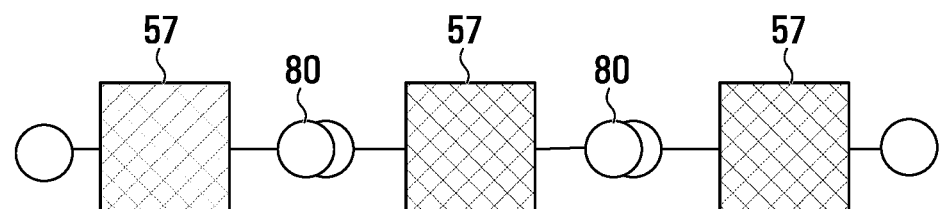
FIG. 15B is a schematic of an exemplary resonator array interconnected with modified connections via components with a strong internal magnetic field coupling.
Figure 15C:
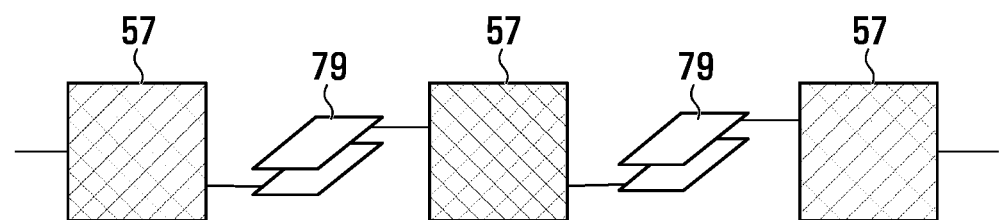
FIG. 15C is a schematic of an exemplary resonator array interconnected with modified connections via components with a strong internal electric field coupling.

The main category of indirect connection (with strong electromagnetic coupling) in the array is further divided by the sub-category of magnetic field coupling connection, as shown in FIG. 15B, and the sub-category of electric field coupling connection, as shown in FIG. 15C.

Both those sub-categories of indirect connection can be achieved using two different methods. The first method is to use an intermediary component that has a strong internal electromagnetic coupling (a strong magnetic field coupling and/or a strong electric field coupling) and that has at least two ports where each port is connected to a different resonator of the array of resonator. The FIGS. 15B and 15C illustrate this first method. The second method is to use a specific positioning of the resonators within the array of resonators and/or a specific design of the individual resonators to have a higher electromagnetic coupling with the neighbor resonators within the array of resonators. An exemplary embodiment of specific positioning can be to have the resonators partially overlap one another within the array of resonators.

The sub-category of magnetic field coupling connection (of the main category of indirect connection) uses a strong magnetic field coupling between two inductances (an exemplary embodiment is to use two flat coils on top of each other, and each one connected to a different repeater resonator unit of the array). Another way to explain this sub-category is as connecting two different repeater resonator units of the array with a transformer where the primary coil and secondary coil are connected to their respective resonator unit. In this case, the resonant tuning frequency of a repeater resonator unit is considered to be calculated using only the main inductance and capacitance of the resonator since it is this part that resonates (loosely coupled) with a transmitter unit or receiver unit (without considering the secondary inductances that serve for the strong internal magnetic field coupling between two repeater resonator units). The other sub-category (of the main category of indirect connection), which is of electric field connection, uses a strong electrical field coupling between two capacitive elements (an exemplary embodiment is to use two flat plates on top of each other, and each one connected to a different repeater resonator unit of the array). The fact of using a strong electromagnetic coupling between the repeater resonator units, instead of the loose coupling of prior art systems, mitigates, in some part, the checkerboard effect. This is especially true for larger array sizes.

The main category of indirect connection (with strong electromagnetic coupling) between the resonator units of the repeater resonator array can be further divided into 4 sub-categories of connection sequence. These are of connecting the resonator units with one another in series (series with cumulatively coupled resonators), anti-series (series with differentially coupled resonators), parallel (parallel with cumulatively coupled resonators) or anti-parallel (parallel with differentially coupled resonators). Those 4 sub-categories of connection sequence (series, anti-series, parallel or anti-parallel) combined with the 2 sub-categories of strong electromagnetic coupling (magnetic field or electric field coupling) and combined with the 2 possible configurations of each individual resonator unit bring a total of 16 configurations within the main category of indirect connection.

Figure 26A:
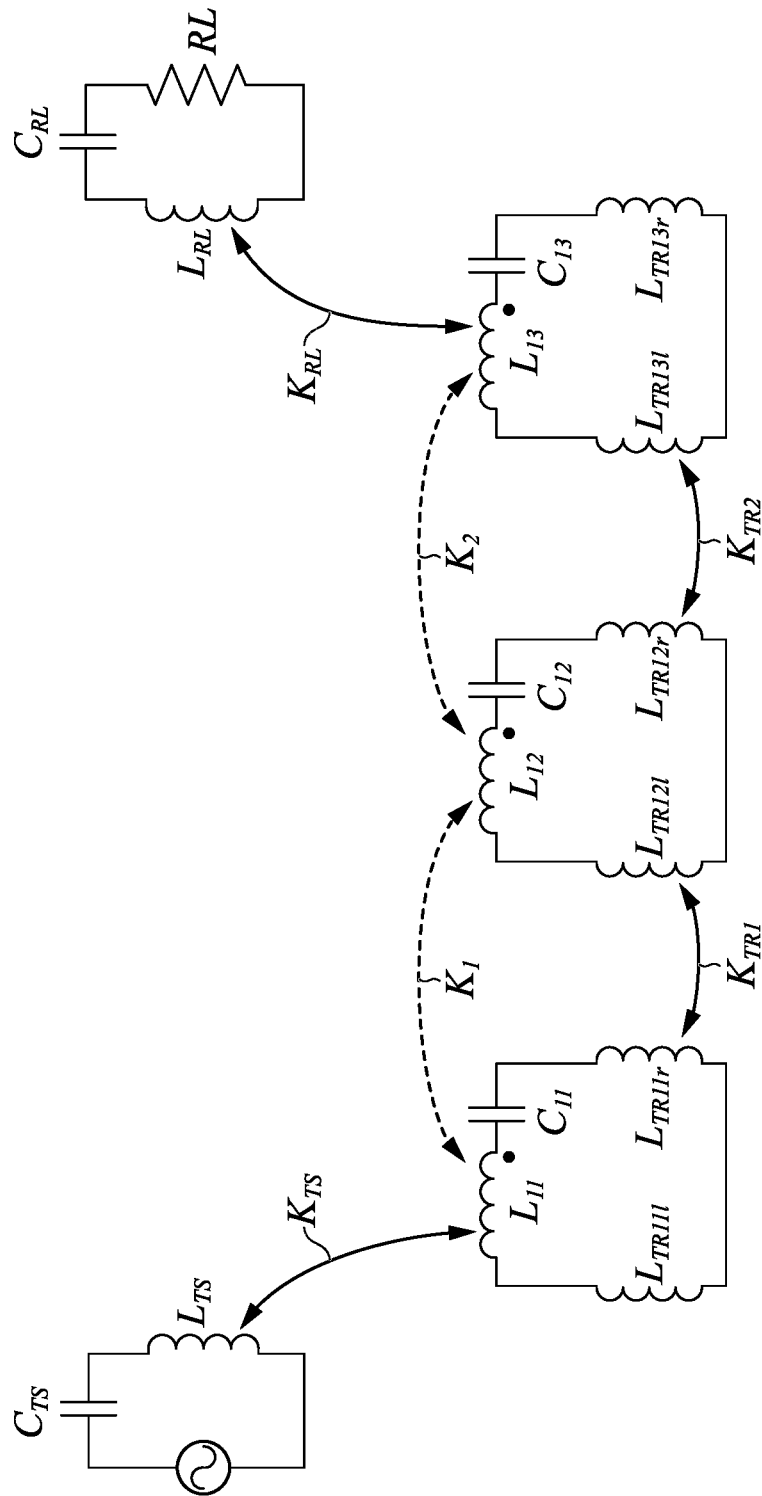
FIG. 26A is an electrical schematic of an array of resonators, a transmitter resonator and a receiver resonator where the intermediary components connect the resonators of the array of resonators in series with one another, and where the edge condition of the array is continuous.
Figure 26B:
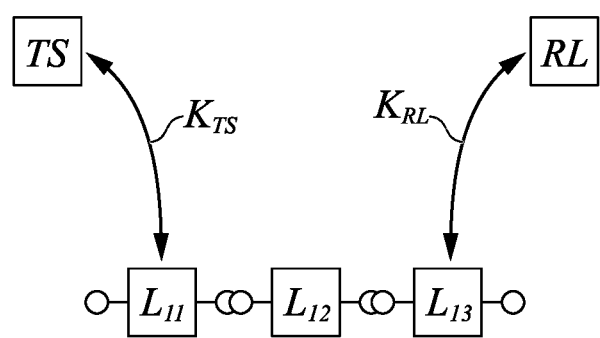
FIG. 26B is a simplified diagram of the electrical schematic of FIG. 26A.

Furthermore, the sub-categories of connection sequence in series and anti-series can further be divided in the sub-categories of edge continuity, either of continuous edge or non-continuous edge. FIGS. 26A and 26B illustrate (with an electrical schematic and simplified diagram respectively) an exemplary embodiment where the resonator array uses the indirect connection with intermediary components with an internal strong magnetic field coupling, where the array is connected in series with the edge continuous. It is possible to see in those two Figures that the resonator units $L_{11}$ and $L_{13}$ have each an extra inductance (respectively $L_{TR11l}$ and $L_{TR13r}$) that are not currently used, but could potentially connect to other resonator units if they are added to the array.

The main categories of indirect connection using strong electromagnetic coupling (for example the strong magnetic field coupling in a transformer) also have the same advantage as the direct connection (with cables), but have a lower efficiency since there is some loss in the transformer (that makes the system generate more heat) and the added advantage of not requiring electromagnetic noise filtering since the array is already set up to resonate efficiently at a desired frequency and is a poor antenna for other frequencies. This indirect connection enables to further isolate each resonator unit from the noise and defect in the system. An exemplary embodiment is to have a wireless power transfer area (array of resonators) that the user can extend and where each resonator unit has a small part of their area overlapping one another to achieve the high magnetic coupling that the two transformer coils need.

Figure 7:
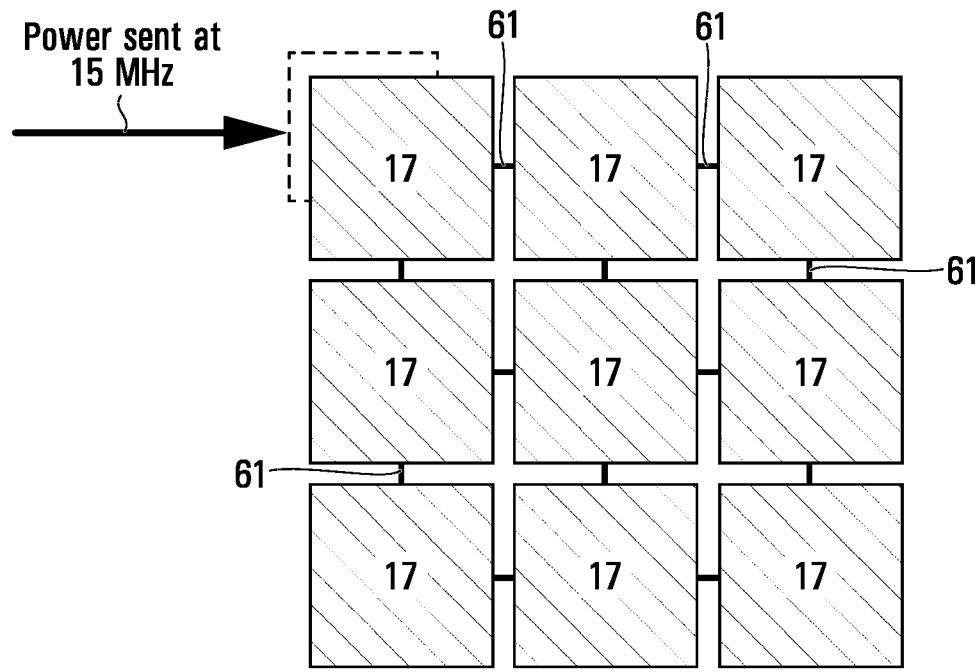
FIG. 7 is a schematic of an exemplary wireless power resonator array in which all of the resonators have a modified connection and are spaced at a close distance from one another.

As illustrated in FIG. 7, each of the resonators of the exemplary array of resonators is set at the same tuning frequency of 17 MHz. Each of the resonators of the array of resonators is connected via a modified connection 61 (a direct connection using wires or an indirect connection). As a result of the modified connection, the checkerboard effect is reduced, where wireless power at the operating frequency of 15 MHz can be delivered across the surface defined by the array of resonators.

Figure 8:
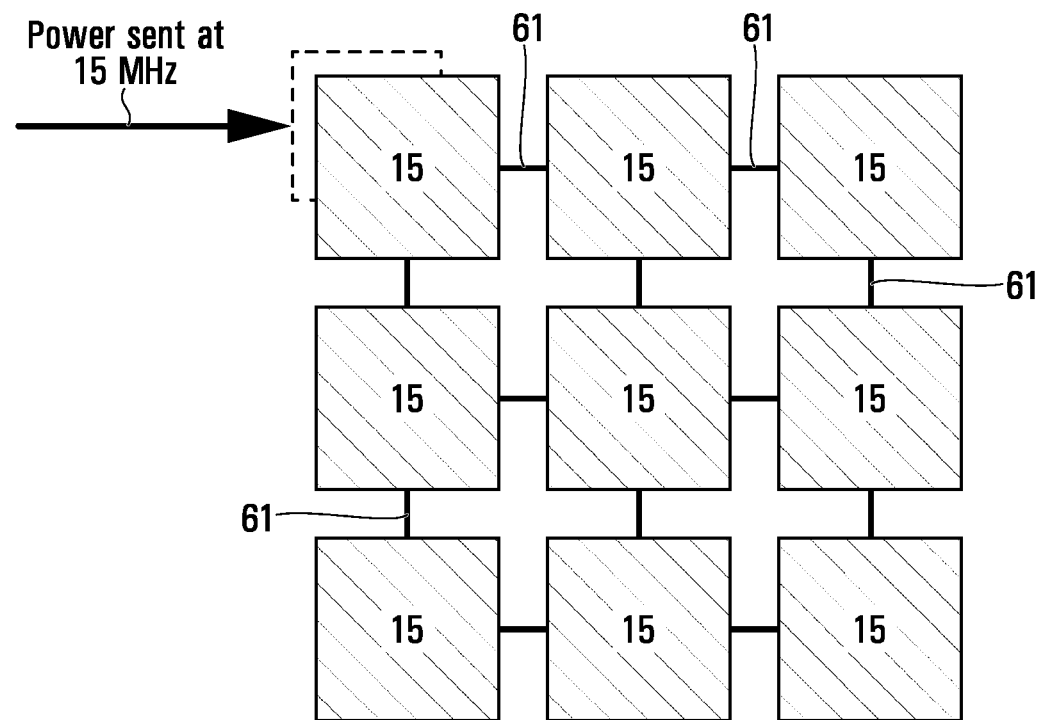
FIG. 8 is a schematic of an exemplary wireless power resonator array in which all of the resonators have a modified connection and are spaced at a farther distance than in FIG. 7.

In FIG. 8, it is shown that the individual tuning frequencies, of the resonators within the array, at which it is more efficient to transfer wireless power may also be modified by increasing the distance between each of the resonators of the array of resonators. Each of the resonators of the array of resonators is further spaced apart than the resonators of the array of resonators of FIG. 7. In FIG. 7, each of the resonators is set at a tuning frequency of 17 MHz, higher than the operating frequency of 15 MHz, in order to compensate for the electromagnetic coupling between the resonators. However, in FIG. 8, the tuning frequency of each of the resonators can be lowered to the operating frequency, as the increase in distance between each resonator reduces the electromagnetic coupling between the resonators and thus makes the frequency at which it is more efficient to transfer power wirelessly closer to the operating frequency of 15 MHz. The resonators of the array of resonators of FIG. 8 are also optionally connected to one another via a wired connection in order to reduce the checkerboard effect.

Figure 9:
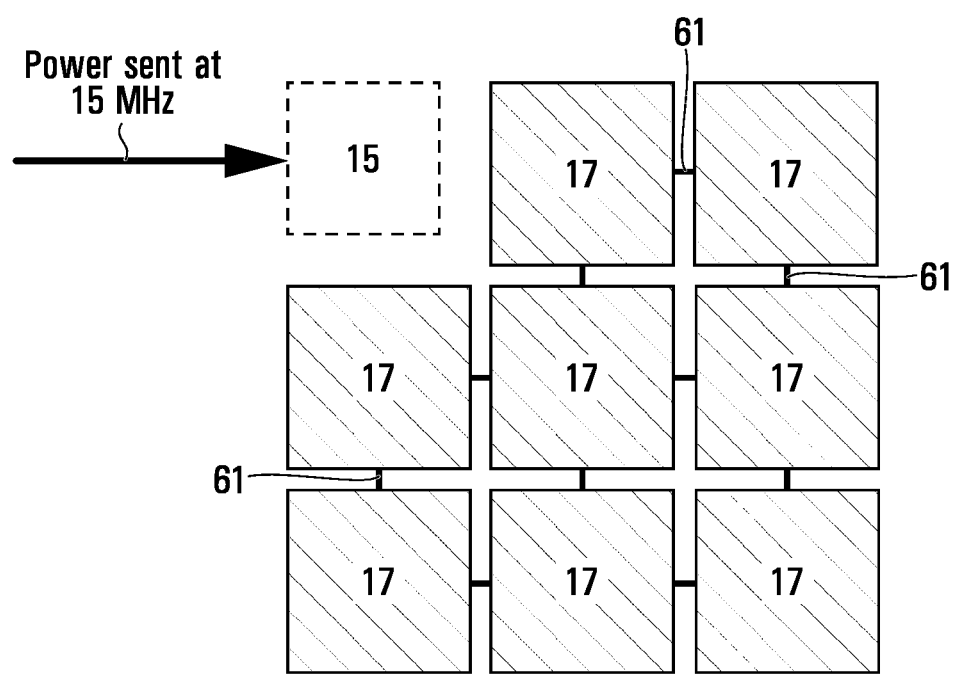
FIG. 9 is a schematic of an exemplary wireless power resonator array also containing the transmitter resonator within and in which only the repeater resonators are interconnected via a modified connection.

In FIG. 9, the top-left resonator of the array of resonators acts as a wireless transmitter resonator, and not a repeater resonator, transmitting wireless power to the other resonators of the array of resonators. As the top-left resonator is a wireless transmitter resonator (e.g. being directly connected to a power source), the top-left resonator is not connected via a wired connection or electromagnetic connection to each of the resonators of the array of repeater resonators. The other resonators, forming the array of repeater resonators, are connected via modified connections 61, in order to reduce the checkerboard effect.

Reference is now made to FIGS. 15B-15C, illustrating an exemplary array of resonators 57 that are connected via a modified connection that is a strong electromagnetic coupling. The strong electromagnetic coupling may provide an alternative to, or be used in combination with, a wired connection. The strong electromagnetic coupling between resonators may be achieved using an intermediary component with two ports, where each port is connected to a different resonator of the array of resonators. The intermediary component may be, for instance, a transformer 80 (e.g. where each portion of the transformer 80 is connected to a resonator), as illustrated in FIG. 15B in order to obtain a strong magnetic field coupling. The intermediary component may be a capacitive element 79 (e.g. where each plate of the capacitor 79 is connected to a resonator), as illustrated in FIG. 15C, in order to obtain a strong electric field coupling.

The intermediary components may be connected in parallel or in series with the internal components of a resonator, where the configurations of the resonators within the array of resonators may be parallel, anti-parallel, series and anti-series.

As shown in FIGS. 26A-B, the intermediary components may be connected in series with respect to one another. In FIGS. 26A-B, the edge conditions shown are continuous, but a similar system could be made where the resonators are connected in series using intermediary components with an internal strong magnetic field coupling but where the edge conditions are non-continuous.

Figure 27A:
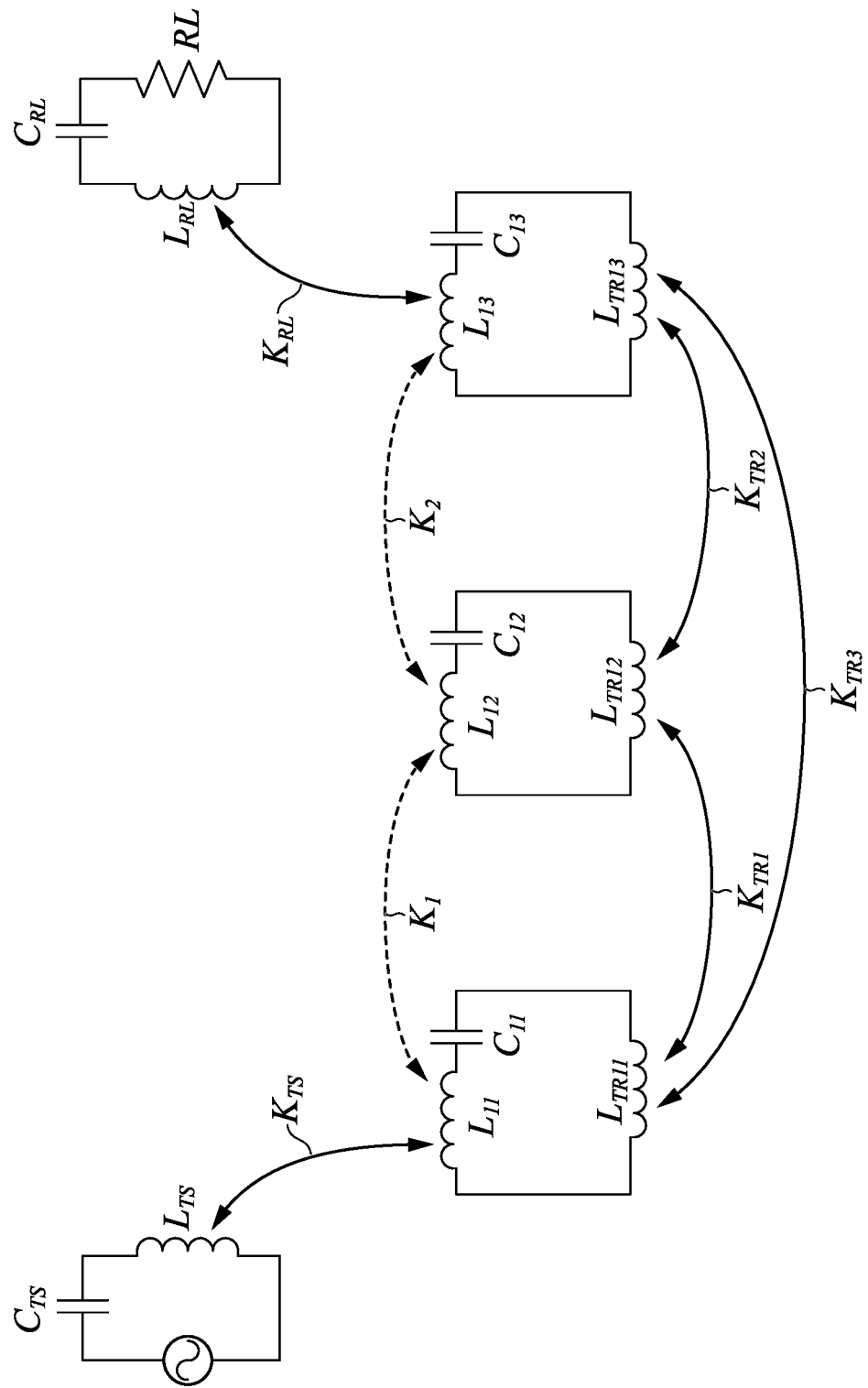
FIG. 27A is an electrical schematic of an array of resonators, a transmitter resonator and a receiver resonator where the intermediary components connect the resonators of the array of resonators in parallel with one another.
Figure 27B:
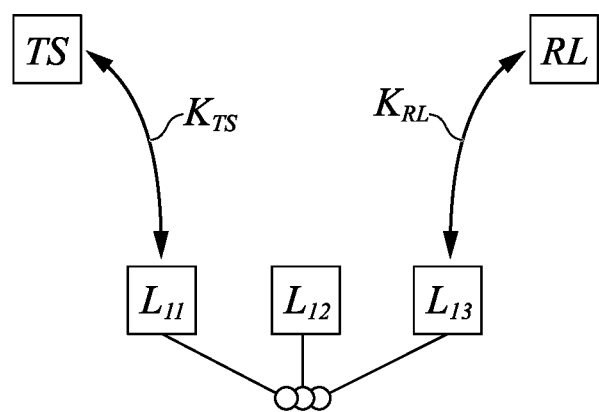
FIG. 27B is a simplified diagram of the electrical schematic of FIG. 27A.

As shown in FIGS. 27A-B, the intermediary components may be connected in parallel with respect to one another.

It will be understood, by a skilled person in the art, that a resonator array could have a configuration (or electrical topology) using modified connections of only one category and sub-category types or a combination of multiples different categories and sub-categories depending on the regions within the resonator array.

Moreover, a skilled person in the art would understand that the present teachings are also applicable in a metamaterial.

Exemplary Uses of the Present Disclosure

The system of the present disclosure, namely the array of resonators, may be integrated into furniture, a floor, a ceiling, a wall, etc., for providing wireless power to one or more loads.

Figure 10A:
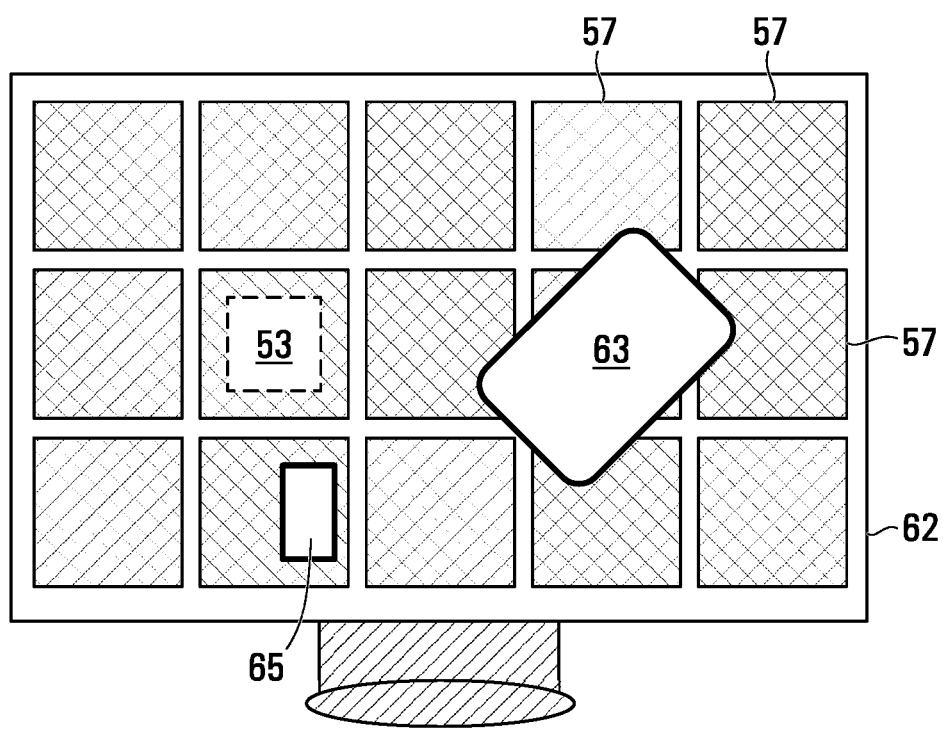
FIGS. 10A-10C are illustrations of an exemplary wireless power resonator array included in a desk.
Figure 10B:
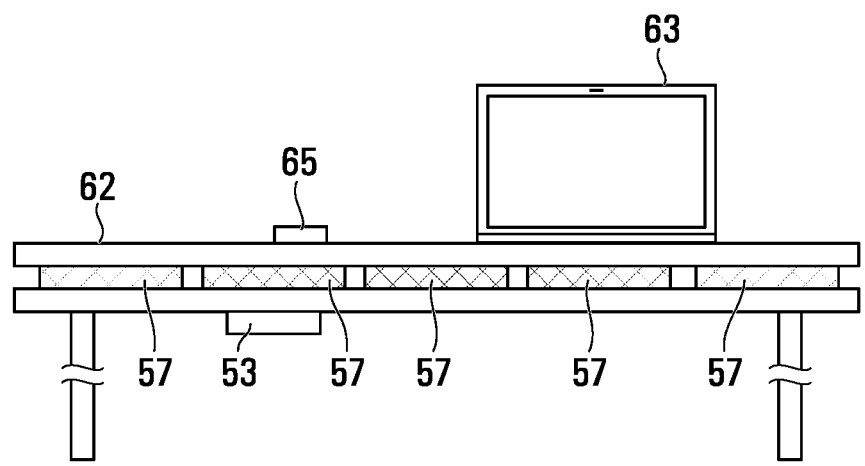

As shown in FIGS. 10A, 10B and 100, the array of resonators 57 (with a transmitter resonator 53 that is positioned under the array of resonators and that has a wired connection to a power source) may be integrated or embedded into the top of a table 62.

In FIG. 10B, the array of resonators 57 is shown to be embedded into the table between two planks of substrate material.

Figure 10C:
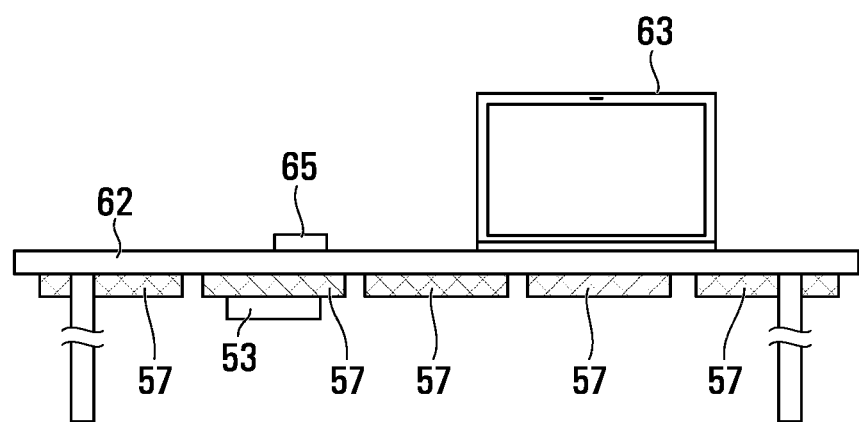

In FIG. 10C, the array of resonators 57, at one side of the resonator, is shown to be joined to the bottom surface of the table 62, where the other side of the resonator is exposed (e.g. retrofitted to the table). This can be, for instance, an after-market application, where the array of resonators is attached to the underside of the table 62 (or of the piece of furniture) after the manufacture of the table 62 (or of the piece of furniture).

Receiver units with loads (e.g. smartphone 65, laptop 63) may be placed on the top of table 62 to be wirelessly powered at the operating frequency of the system.

It will be understood that a table is used in FIGS. 10A and 10B for the purposes of illustration, and that other furniture, such as a night table, a desk, etc. can include the system of the present disclosure without departing from the present teachings.

The table 62 presents a wireless power transfer area for mobile devices (such as cellphones, lamps and laptops). In this case, by using different individual tuning frequencies of the resonator units, of the resonator array, that are joined to the table 62, the checkerboard effect of the array of resonators is minimized. However, this system may suffer from presenting a small bandwidth of frequency range around the operating frequency, be highly susceptible to electromagnetic parasitic elements in its environment of use and use a more complex tuning system to be compatible for multiple sizes of resonator array. To address this issue, the array of repeater resonators may be directly connected (modify connection) to one another. In some embodiments, the array of resonators may be directly connected in series (with cumulatively loosely-coupled resonators). This allows for a more stable design of resonator units (inductance and capacitance) that does not require making substantial changes to the array layout depending on the array size, making the simulation easier and providing for a larger bandwidth of frequency range (permitting more error on the operating frequency of the system while remaining efficient). However, if the resonators of the array of resonators are directly connected in series, if one of the resonator units is, e.g., defective, is disconnected (or cut), or is significantly disturbed by an added parasitic element (such as a metal plate like aluminum or steel), the whole array could be compromised. Connecting the resonator units of the array in parallel (with cumulative loosely-coupled resonators) allows the partial or complete isolation of one resonator unit from the other and at the same time provides the benefits of interconnecting the resonator units. As such, the system of the present disclosure allows for the use of the same resonator unit design between different surface formats, requiring only a different number of resonator units (and/or making the same resonator follow the curve of the table while conserving the same inductance value), that can have a wireless power transfer area several times larger than the receiving unit and transmitting unit, that can wirelessly power several receiver units at the same time, that is really stable in a real environment where the electromagnetically interfering elements are not controlled, and that has a great efficiency and uniformity of wireless power transfer.

In some examples, the array of resonator may be joined to flooring or to walls, such that these surfaces also provide sources of wireless power transfer.

In some embodiments, as shown in FIGS. 20A and 20B, the array of resonators 57, may be smaller than the transmitter resonator 53 and be relatively of the same size as the receiver resonator 101. In other embodiments and the receiver unit 101, it will be understood that the array of resonators may also be larger than the transmitter resonator. In the example of FIGS. 20A and 20B, the receiver unit 101 may be attached (e.g. in the same PCB substrate or stuck together in the same mechanical casing) to the array of resonators 57 to increase the coupling factor between the transmitter unit 53 and the receiver unit 101. It will be understood by a skilled person in the art, that a similar embodiment can be made where the resonator array is instead of relatively the same size of the transmitter resonator, or another embodiment where there are multiple resonator arrays.

Figure 17:
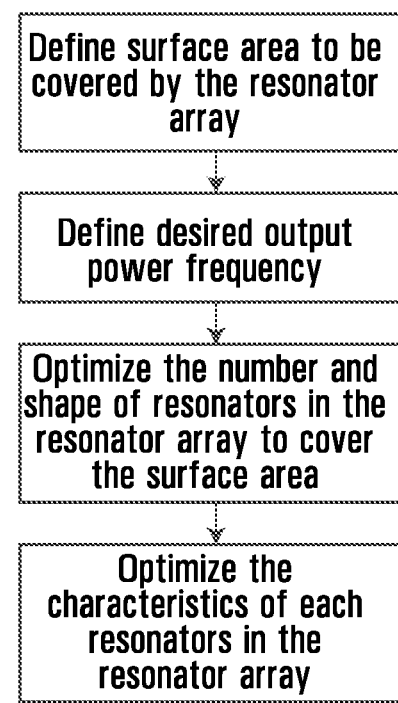
FIG. 17 is a flowchart of an exemplary process of selecting and optimizing the characteristics of the resonator array.

Reference is now made to FIG. 17, illustrating an exemplary method of preparing or designing the array of resonators for wireless power transfer across the surface of the array of resonators.

The surface area to be covered by the array of resonators is defined. For instance, the surface may be that of a floor, a wall, a piece of furniture (e.g. a chair), etc.

The operating frequency of the system is then defined.

The resonators are then laid out to cover the shape of the surface area for wireless power transfer (either during a simulation or in real life). The number of resonators may depend on the properties of the surface area, the dimensions of the resonators, the type of device to be wirelessly powered, etc. When the resonators are laid out or embedded in a tile, the tiles may be placed across the surface area to cover the surface area. Once laid out, the resonators form the array of resonators.

The properties of the resonators of the array of resonators are then optimized in order to reduce the checkerboard effect, to maximize the efficiency of wireless power transfer over each resonator of the array and to maximize the stability of the system. This may include providing a modified connection between the repeater resonators of the array of repeater resonators, configuring the tuning frequency to the operating frequency of the system, etc.

Exemplary Array Configurations

The configuration of the resonators within an array of resonators may vary, where a specific configuration of resonators may be selected based on the nature of the surface for providing wireless power, cost concerns, the form of the surface for providing wireless power, etc.

FIGS. 11A-12B illustrate exemplary, non-limitative configurations of resonators within an array of resonators, where each geometric shape and position represents a resonator within the array of resonators (the geometric shapes represent the overall shape of each resonator).

For instance, in FIG. 11A, the position of each resonator within the array of resonators is represented by a hexagon, where each resonator is staggered with respect to the position of its neighbour.

Figure 11G:
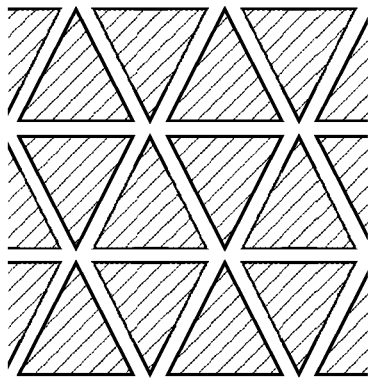
FIGS. 11A-11O are schematic drawings of exemplary wireless power resonator 2D arrays with different resonator shapes and patterns.

In FIGS. 11F and 11G, the resonators at the edge of the resonator array may have a different shape, or be cut, to accommodate the overall shape of the desired wireless power transfer surface.

Figure 11H:
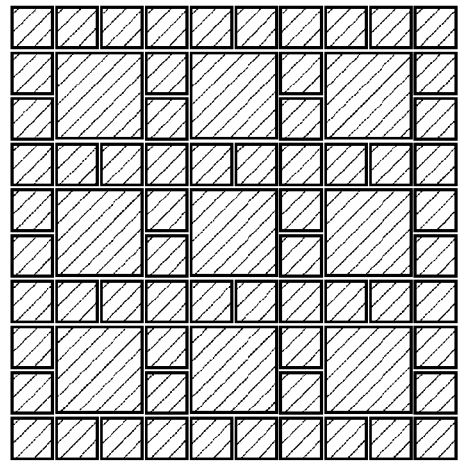
Figure 11I:
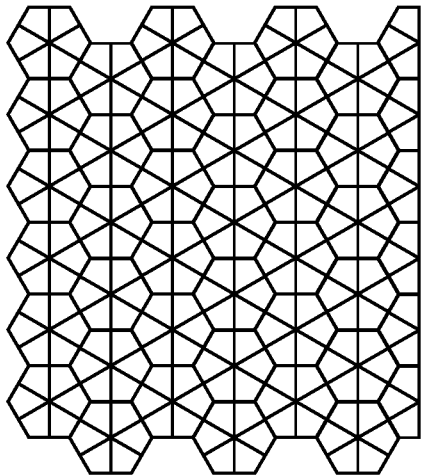
Figure 11J:
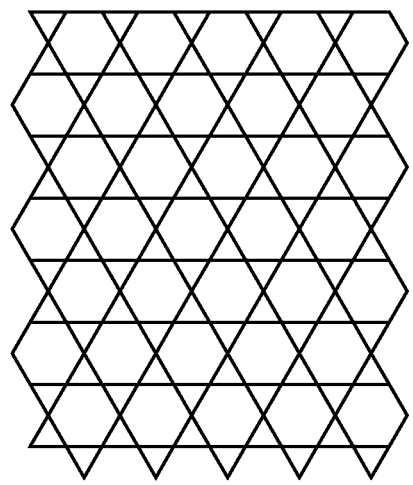
Figure 11K:
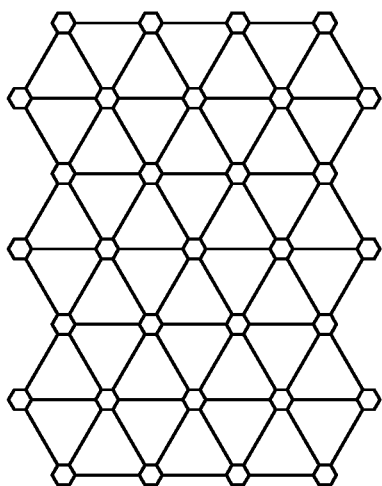
Figure 11L:
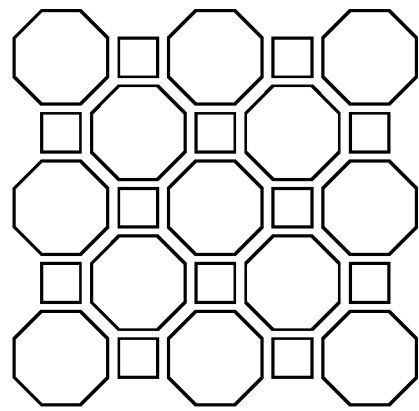
Figure 11M:
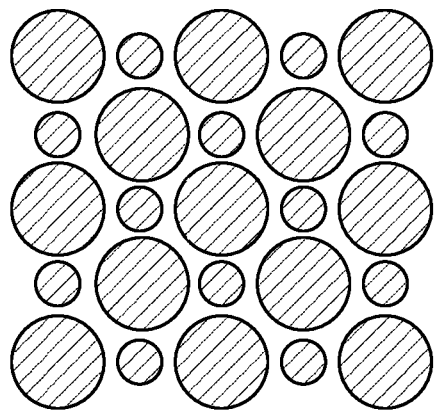

In FIG. 11H, resonators (and/or the material on which they are laid or in which they are embedded) may have different dimensions, where the smaller resonators are represented by the small squares, and the larger resonators by the large squares. Other examples of the difference in dimensions between the resonators are found in FIGS. 11M and 12B.

It will be understood that the array of resonators may be implemented across a 2D surface or a 3D surface, and/or that the stacking and overall shape (represented by a simple or complex geometric shape) of each resonator of the array of resonators can vary.

Figure 11N:
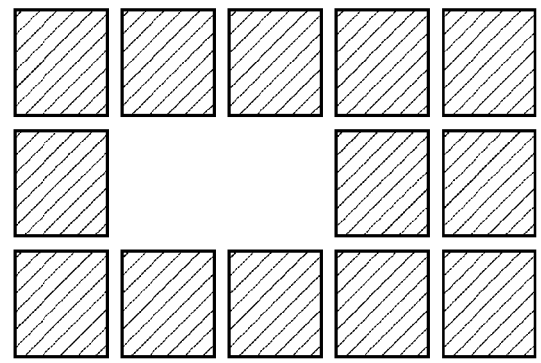

As shown at FIG. 11N, the array of resonators does not have to be composed by a continuous matrix of resonators. There may be gaps within the resonator pattern defined by the array of resonators.

Figure 11O:
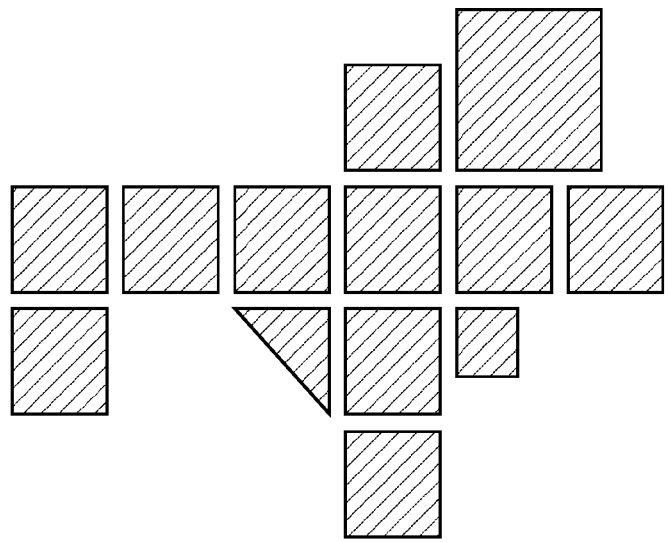
Figure 12A:
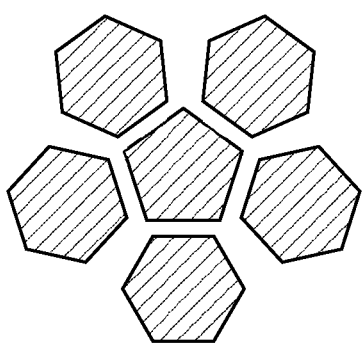
FIGS. 12A-12B are unfolded schematic drawings of exemplary wireless power resonator arrays with different resonator shapes and patterns, where the original resonator arrays are in three-dimensions.
Figure 12B:
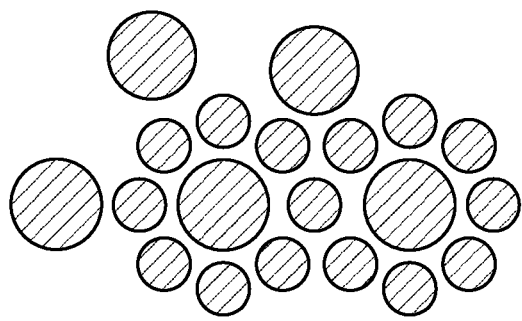

As shown in FIG. 11O, the array of resonators may take on any form, where the resonators may be positioned with respect to one another to accommodate the space of the charging area.

In some embodiments, the resonators of the array of resonators may be at an angle with respect to one another, e.g., to accommodate a non-flat surface.

In some embodiments, the resonators of the array of resonators may be positioned on two or more parallel planes instead of the resonators being positioned side-by-side.

In some embodiments, the resonators of the array of resonators may be of different dimensions (i.e. different sizes).

In some embodiments, the resonators of the array of resonators may have different shapes (e.g. some are squares, where others are rectangles or circles, etc.)

Figure 21:
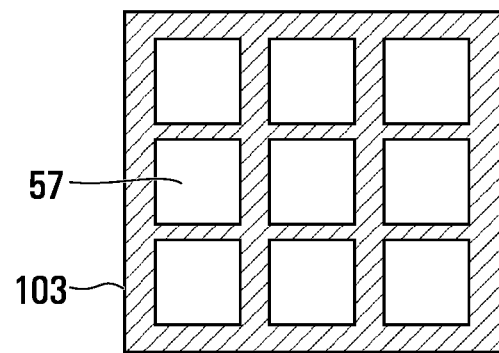
FIG. 21 is a schematic of an array of resonators packaged within a housing.
Figure 22:
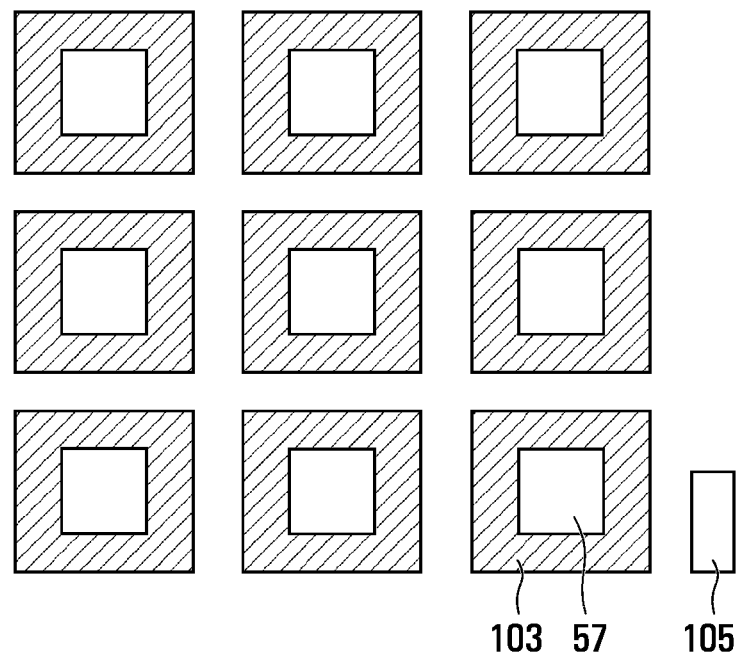
FIG. 22 is a schematic of a modular array of resonators that are each separated in their own housing and where their tuning frequency can be adapted using an adaptative tuning module

As shown in FIG. 21, the resonators 57 of the array of resonators may be joined to a substrate material (e.g. FR4 for PCB, laminate types for tables, cardboard, wood, plastic, floor underlayment, etc.), or enclosed or packaged in a same material (represented by item 103), forming a unit of resonators 57. Each of the individual resonator units (that are joined to the same substrate material) may be used to assemble a greater array for covering a given surface (where the individual resonator units are modular before being joined to the same substrate). As shown in FIG. 22, each of the resonators 57 of the array of resonators may be joined to its own substrate material or enclosed in its own separate material (represented by the items 103), separate from an external adaptive tuning module 105. As such, the resonators laid on or embedded in their respective materials may result in a tile for modular assembly, where the tiles may be arranged side by side in order to arrive at an array of resonators configured to accommodate the properties (e.g. size, shape, curvature) of the surface that is to provide wireless power.

Figure 23A:
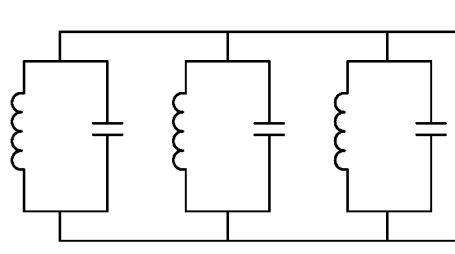
FIG. 23A is an electrical schematic of an array of resonators that are interconnected with wires and have a connecting port for an external adaptative tuning module.
Figure 23B:
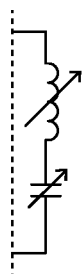
FIG. 23B is an electrical schematic of an external adaptative tuning module that has a variable inductance and a variable capacitance in series to one another, the adapting tuning module having a connecting port to be connected to a resonator array.
Figure 23C:
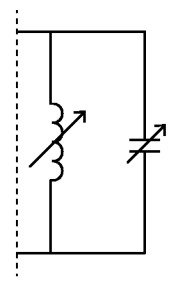
FIG. 23C is an electrical schematic of an external adaptative tuning module that has a variable inductance and a variable capacitance in parallel to one another, the adaptive tuning module having a connecting port to be connected to a resonator array.
Figure 23D:
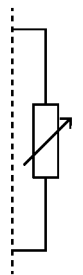
FIG. 23D is an electrical schematic of an external adaptative tuning module that has a variable reactance or impedance, the adapting tuning module having a connecting port to be connected to a resonator array.
Figure 23E:
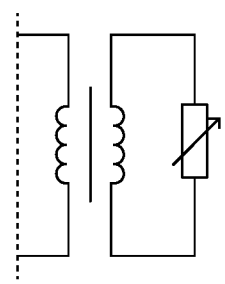
FIG. 23E is an electrical schematic of external adaptative tuning module that has a variable reactance or impedance and a transformer that is in parallel with the variable reactance or impedance and have a connecting port to be connected to a resonator array.

Array of Resonators with Adaptive Tuning:

Reference is now made to FIG. 23A, illustrating a resonator array of three resonators (being interconnected using the modified connection of direct connection) and having a port to connect to an external adaptative tuning module. The FIGS. 23B-E illustrate some of the possible internal components of the external adaptative tuning module. Those components are configured for adaptatively tuning the resonant frequency of the resonators in the array of resonators.

The adapting of the tuning frequency may be achieved by having an adaptive tuning module with an adjustable inductance value, an adjustable capacitance value, an adjustable reactance value and/or an adjustable impedance value. The external adaptative tuning module may further include elements to modify the power (voltage and/or amperage) going through the adaptative components (or modifying the Smith Chart responses), such as using a transformer.

Figure 24A:
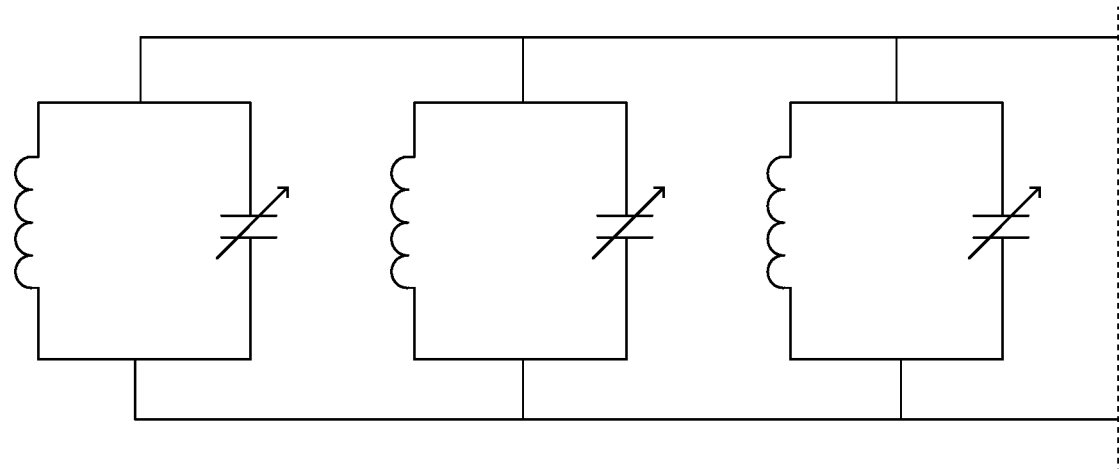
FIG. 24A is an electrical schematic of an array of resonators with an internal variable capacitance.

As shown in FIG. 24A, the capacitance values of the resonators may be adaptative, thereby allowing for an internal adjustment of the tuning frequencies of the resonators of the array of resonators.

Figure 24B:
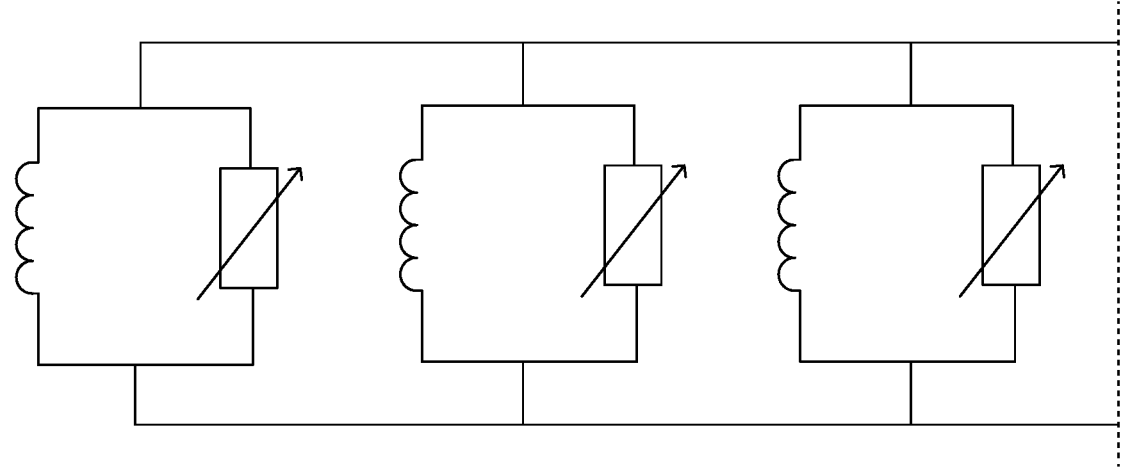
FIG. 24B is an electrical schematic of an array of resonators with an internal variable reactance or impedance.
Figure 25A:
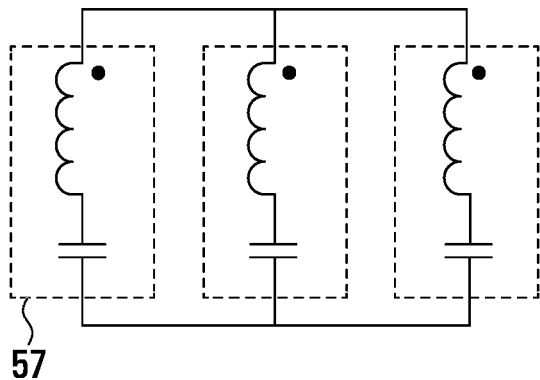
FIG. 25A is an electrical schematic of an array of resonators interconnected with wires and arranged in parallel where the components of the resonators are internally arranged in series.
Figure 25B:
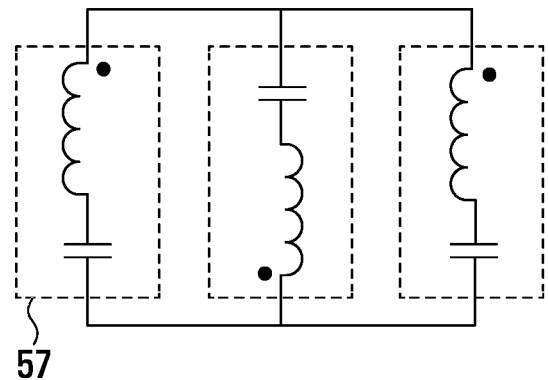
FIG. 25B is an electrical schematic of an array of resonators interconnected with wires and arranged in anti-parallel where the components of the resonators are internally arranged in series.
Figure 25C:
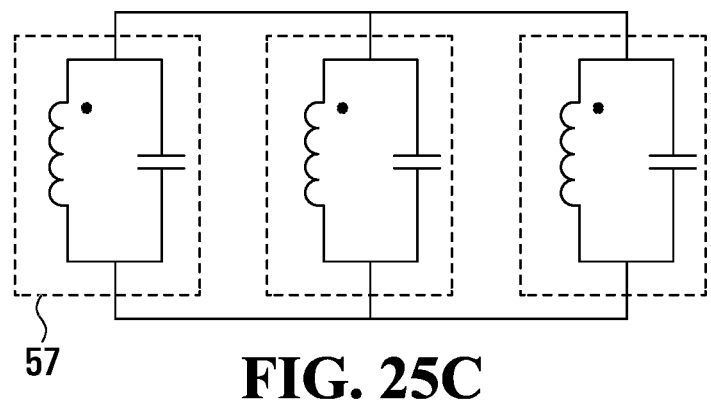
FIG. 25C is an electrical schematic of an array of resonators interconnected with wires and arranged in parallel where the components of the resonators are internally arranged in parallel.
Figure 25D:
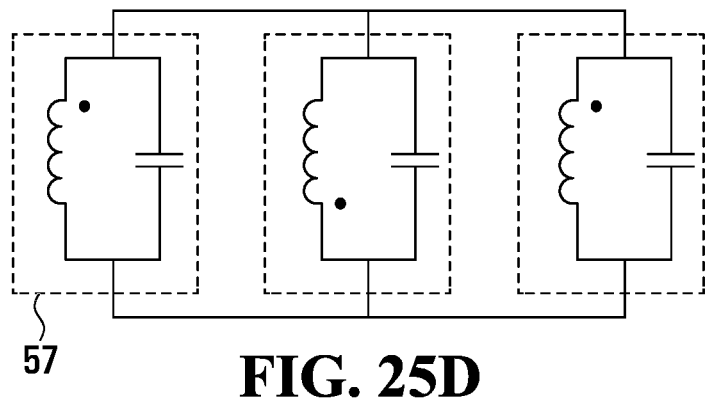
FIG. 25D is an electrical schematic of an array of resonators interconnected with wires and arranged in anti-parallel where the components of the resonators are internally arranged in parallel.
Figure 25E:
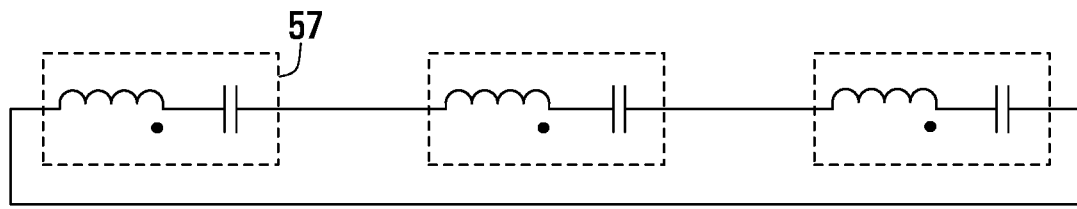
FIG. 25E is an electrical schematic of an array of resonators interconnected with wires and arranged in series where the components of the resonators are internally arranged in series.
Figure 25F:
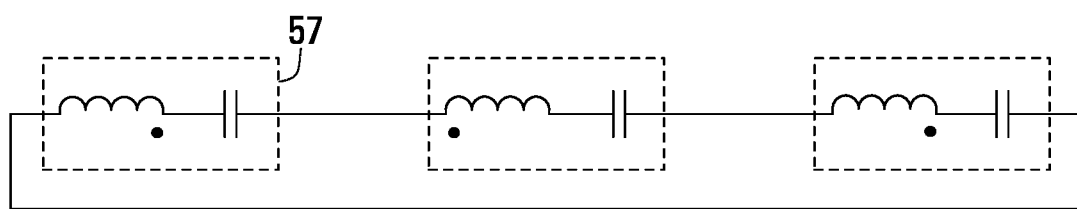
FIG. 25F is an electrical schematic of an array of resonators interconnected with wires and arranged in anti-series where the components of the resonators are internally arranged in series.
Figure 25G:
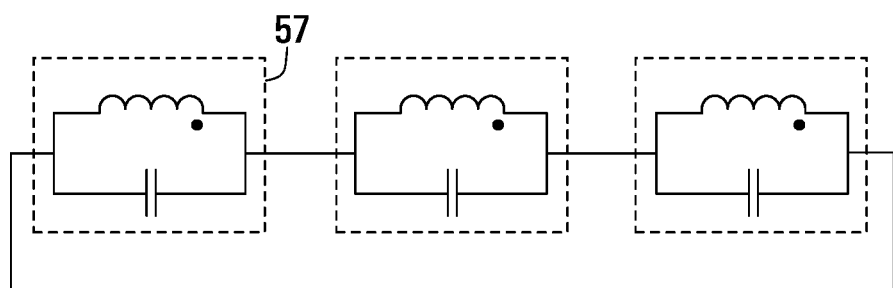
FIG. 25G is an electrical schematic of an array of resonators interconnected with wires and arranged in series where the components of the resonators are internally arranged in parallel.
Figure 25H:
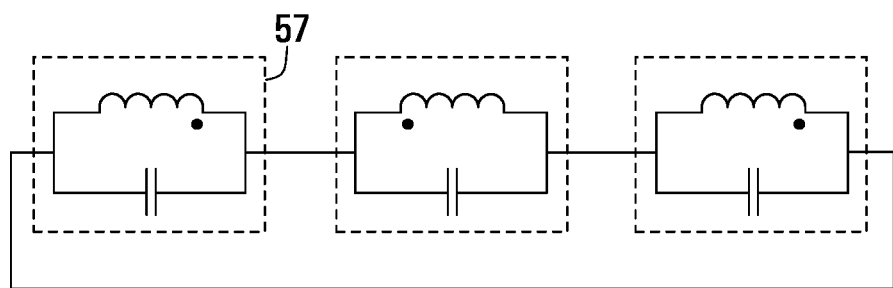
FIG. 25H is an electrical schematic of an array of resonators interconnected with wires and arranged in anti-series where the components of the resonators are internally arranged in parallel.

As shown in FIG. 24B, the resonators 57 of the array of resonators may have an internal reactance or impedance with an adjustable value. The adaptive capacitance, reactance or impedance allows the system to adapt its tuning frequency for the dimensions of the surface area, the number of resonators and to pally the effects of items or materials (i.e. parasitic items or materials—such as a metal with an electromagnetic shield quality) that may undesirably impact the frequencies of the system.

In some examples, each resonator may be adapted to adjust its own values e.g. inductance value and/or an adjustable capacitance value.

If the resonators of the resonator array are packaged within the same substrate or if the resonators are individually packaged such as, e.g. to produce tiles, since the mutual inductances of the different resonators and the pattern chosen for the wireless power surface or the influence of parasitic element in the environment can detune or simply change the frequency at which a wireless power surface has the most efficiency of wireless power transfer (which then can differ from the operating frequency of the system), it can be advantageous to have a system to adapt the tuning frequency of at least some of the resonators. The tuning may be performed by an outside system that is connected to the resonator array and that adapts the tuning frequency depending on the requirements of the array of resonators. Similarly, an inside system (i.e. included in the array of resonators or included in each individual resonator) may be used to the same effect.

Some examples may be to use a variable capacitor (controlled numerically or otherwise to change value of capacitance), different capacitors in a network that selectively short circuit or open circuit a combination of the capacitors or inductors, varactor, etc.

The adaptative tuning module can be electrically directly connected to the resonator array but mechanically attach to the transmitter and/or control by the transmitter unit (the RF amplifier).

A skilled person in the art would readily understand that all the teachings (any one of the teachings can be applied alone or in combination with the other teachings) in the present disclosure are applicable for systems that transfer wireless power in the near field (in the non-radiative, also known as the reactive region, or the radiative region) using the magnetic field and/or the electric field, in the transition region or far field region using the electromagnetic field. Similarly, the skilled person in the art would understand that the system can use a variety of resonators in different configurations such as, one or multiple transmitter resonators, one or multiple RF power amplifiers, one or multiple receiver resonators, one or multiple powered devices, zero, one or multiple repeater resonators, and one or multiple resonator arrays (made of transmitter resonators, of receiver resonators or repeater resonators). In the case there is multiple resonator arrays, the resonator arrays can contain the same number of resonator units and/or differ in number of resonator units to one another. The resonator units can be made to have all of the same basic geometric shape than the other resonator units of the system or they can differ from one another. The dimensions of the units of the array of resonators can be smaller, the same size or bigger than the transmitter resonator and/or the receiver resonator. The same understanding of the present teachings is made for applications on different wirelessly power devices, wireless power surfaces, for metamaterials or for non-wireless power application (such as photonics or other).

Furthermore, the present teachings are applicable to combinations of resonators or array of resonators that are intended to augment the distance of wireless power transfer, to augment the area of wireless power transfer, to augment the electromagnetic coupling coefficient between two components, to isolate a component from the electromagnetic interference of another component (or electromagnetic interaction between those two components), to interact with electromagnetic fields (e.g. to change the main direction, to focus, to defocus or lens the electromagnetic field), or electromagnetic waves.

Exemplary Study

The following is an exemplary study demonstrating the outputted wireless power transfer efficiency from the system of the present teachings. As the exemplary study is but illustrative to show representative examples, it should not limit the scope of the present disclosure, only added for illustrative and representative purposes. It will be understood that other exemplary studies may be used to further illustrate and represent the present disclosure without departing from the present teachings.

The present example is illustrated as being a system of 1 transmitter resonator unit, 1 receiver resonator unit and a repeater resonator array of size 1 by 3 (a total of 3 repeater resonator units put side by side in a line). In this same example, the transmitter resonator (TS) is positioned over the position (1,1) of the repeater resonator array and the receiver resonator (RL) is moved from each of the positions of the array (1,1), (1,2) and (1,3). "T1-R1" means the TS at the position 1 (1,1) and the RL at the position 1 (1,1); "T1-R2" mean the TS at the position 1 (1,1) and the RL at the position 2 (1,2), and so forth. Furthermore, the example hereafter is a simple case where the cross couplings are removed (the magnetic coupling between resonators that are not the main path of power transfer are considered to be zero). In this example, the operating frequency of the system is 15 MHz, which is the same as the tuning frequency of RL and TS (however, it will be understood that, in some examples, the operating frequency may be different from the tuning frequencies of RL and TS). The RF power amplifier has an output impedance of 50 Ohm and is connected directly to the transmitter resonator. The receiver resonator is further connected to a resistive load of 5 Ohm. The present study also does not include an impedance matching optimization.

For the purpose of the present study, it would be readily understood that a person skilled in the art could use the provided input values of the examples to perform the necessary calculations to obtain the values of the system described herein, the performance of the calculations residing within the ambit of the knowledge of the skilled person. For instance, the calculations may be performed through a Spice simulation with an existing software or through the development and solution of analytical matrices, and performed through the brute force method (also known as the "proof by exhaustion") to arrive at an optimized solution of individual tuning frequencies for the resonators (since there is multiple possible optimized solutions, also known as extremums in the functions, in the complex examples exemplified below) for a given operating frequency. As such, it will be understood that a software could also be devised to perform these calculations to arrive at an optimized solution, thereby accelerating the calculation process on the different optimized tuning frequencies. In a real-world application, for wireless power transfer with magnetic field in the near field, the values of inductance (self-inductances) from the coils could be obtained with a finite element modeling software, manufacturing the coils and measuring their responses in radio frequencies, using analytical calculation or custom-made simulation software. The different values of magnetic coupling, and thus of mutual inductance, could be determined through the use of the same tools. The capacitance value could be obtained from a capacitor or from parasitic capacitance from cables side by side. Some exemplary calculations performed to reach some values may be:

Individual tuning frequency:

$$f_i = \frac{1}{2\pi \cdot \sqrt{L_i \cdot C_i}},$$

where "i" indicate the specific value for a resonator.

Mutual inductance $M_{ij} = K_{ij} \sqrt{L_i \cdot L_j}$, where $i \neq j$.

The input values and the simulation output for a prior art and the aspects of the present disclosure are as follows:

Prior Art Values (Case 1):

TABLE 1 values for the different resonators of a prior art (Case 1) wireless power system (simulation input).

| Individual resonator values | Inductance (L) [uH] | Capacitance (C) [pF] | Resistance (ESR) [ohm] | Individual Resonant Tuning Frequency (f) [MHz] |
|---|---|---|---|---|
| Transmitter (TS) | 1.70 | 66.22 | 0.105 | 15 |
| Receiver (RL) | 1.70 | 66.22 | 0.105 | 15 |
| Repeater 1 (L11) | 2.49 | 45.21 | 0.73 | 15 |
| Repeater 2 (L12) | 2.49 | 45.21 | 0.73 | 15 |
| Repeater 3 (L13) | 2.49 | 45.21 | 0.73 | 15 |

TABLE 2 magnetic coupling factors between the different resonators of a prior art (Case 1) wireless power system (simulation input).

| Magnetic Coupling Factor (K) | TS | L11 | L12 | L13 | RL |
|---|---|---|---|---|---|
| TL | 1 | 0.2219 | 0 | 0 | 0 |
| L11 | 0.2219 | 1 | −0.08 | 0 | 0 |
| L12 | 0 | −0.08 | 1 | −0.08 | 0 |
| L13 | 0 | 0 | −0.08 | 1 | 0.056* |
| RL | 0 | 0 | 0 | 0.056* | 1 |

The asterisk (*) indicates that this magnetic coupling corresponds to "T1-R3" and otherwise needs to be changed to 0. For "T1-R1", the magnetic coupling between RL and L11 needs to be 0.056. For "T1-R2", the magnetic coupling between RL and L12 needs to be 0.056. This is the same with the other table indicating magnetic coupling between resonators.

TABLE 3 efficiency values, depending on the receiver position, for a prior art (Case 1) wireless power system (simulation output).

| Efficiency Depending on the Receiver Position (TS is over L11) | | RL position 1 (over L11) [T1-R1] | RL position 2 (over L12) [T1-R2] | RL position 3 (over L13) [T1-R3] | Array average |
|---|---|---|---|---|---|
| Efficiencies with 15 MHz of operating frequency | dB | −0.546 | −24.88 | −0.805 | −2.426 |
| | % | 88.19 | 0.325 | 83.08 | 57.20 |

Values for the Exemplary Embodiment of the Present Disclosure of Different Individual Tuning Frequencies (Case 2):

In the following example illustrating one of the present disclosures, the tuning frequency of the transmitter and receiver resonators are kept at 15 MHz but there could be scenarios where the system is more efficient when those resonators have also a different tuning frequency then the operating frequency.

TABLE 4 values for the different resonators of the wireless power system of the present disclosure when using the different tuning frequencies (Case 2) within the resonator array (simulation input).

| Individual resonator values | Inductance (L) [uH] | Capacitance (C) [pF] | Resistance (ESR) [ohm] | Individual Resonant Tuning Frequency (f) [MHz] |
|---|---|---|---|---|
| Transmitter (TS) | 1.70 | 66.22 | 0.105 | 15 |
| Receiver (RL) | 1.70 | 66.22 | 0.105 | 15 |
| Repeater 1 (L11) | 2.49 | 45.21 | 0.73 | 15 |
| Repeater 2 (L12) | 2.49 | 41.80 | 0.73 | 15.6 |
| Repeater 3 (L13) | 2.49 | 39.74 | 0.73 | 16 |

TABLE 5 magnetic coupling factors between the different resonators of the wireless power system of the present disclosure when using the different tuning frequencies (Case 2) within the resonator array (simulation input).

| Magnetic Coupling Factor (K) | TS | L11 | L12 | L13 | RL |
|---|---|---|---|---|---|
| TS | 1 | 0.2219 | 0 | 0 | 0 |
| L11 | 0.2219 | 1 | −0.08 | 0 | 0 |
| L12 | 0 | −0.08 | 1 | −0.08 | 0 |
| L13 | 0 | 0 | −0.08 | 1 | 0.056* |
| RL | 0 | 0 | 0 | 0.056* | 1 |

TABLE 6 efficiency values, depending on the receiver position, for the wireless power system of the present disclosure when using the different tuning frequencies (Case 2) within the resonator array (simulation output).

| Efficiency Depending on the Receiver Position (TS over L11) | | RL position 1 (over L11) | RL position 2 (over L12) | RL position 3 (over L13) | Array average |
|---|---|---|---|---|---|
| Efficiencies with 15 MHz of operating frequency | dB | −2.628 | −1.555 | −3.219 | −2.412 |
| | % | 54.60 | 69.90 | 47.65 | 57.39 |

Figure 18A:
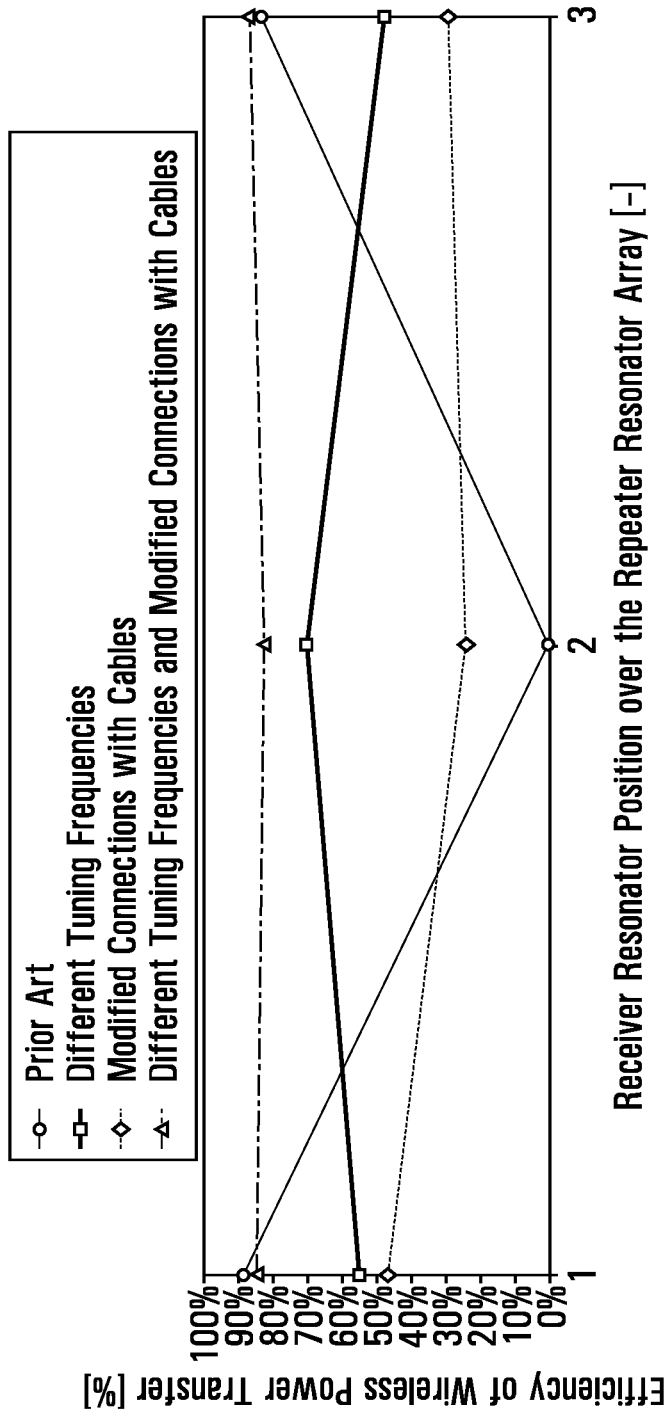
FIG. 18A is an exemplary graph illustrating wireless power transfer efficiency, in percentage, as a function of the receiver's position above the array of resonators, for different resonators array topologies.
Figure 18B:
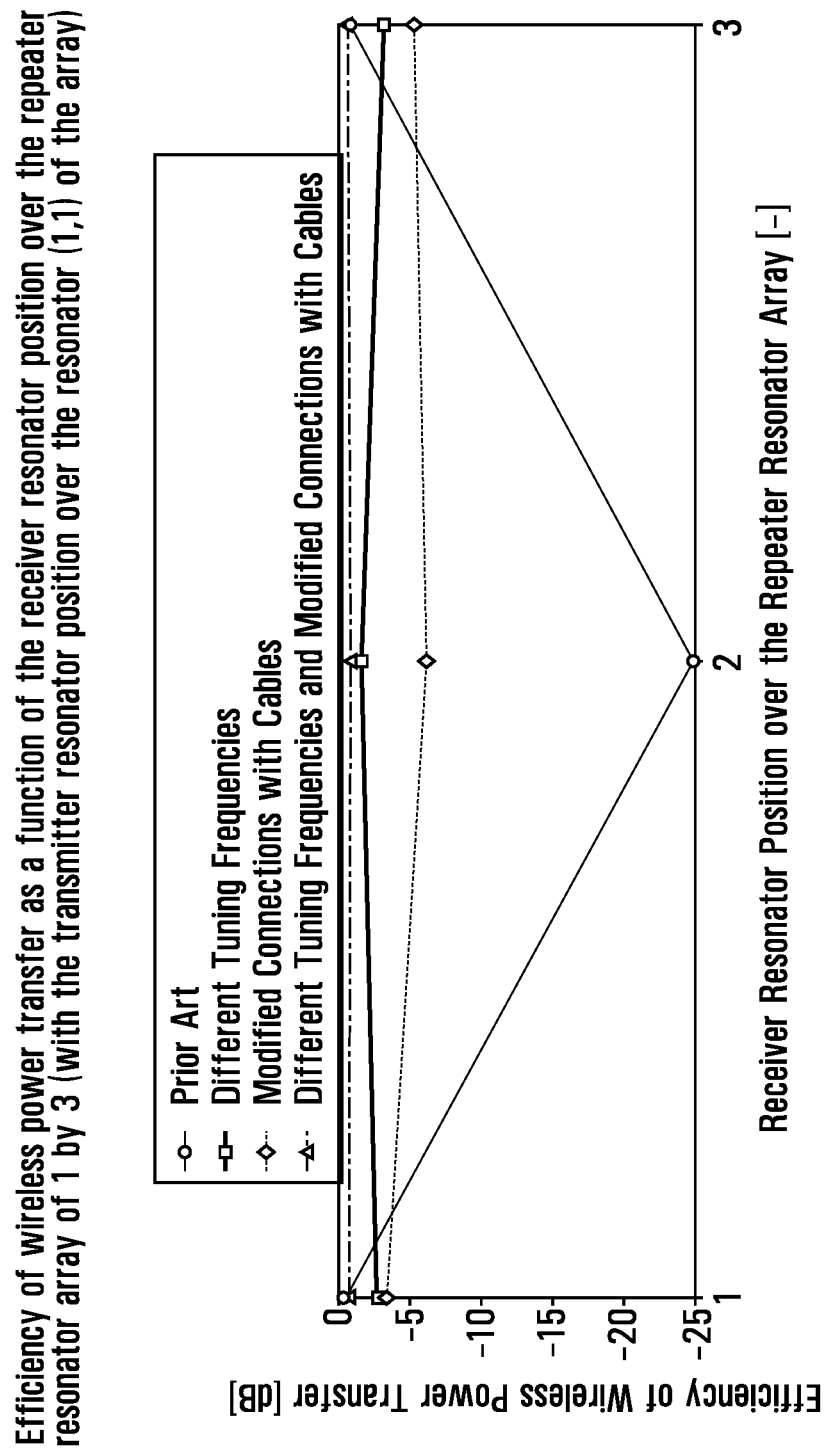
FIG. 18B is an exemplary graph illustrating wireless power transfer efficiency, in decibels, as a function of the receiver's position above the array of resonators, for different resonator array topologies.

In Tables 4, 5 and 6, the values in bold represent values that change between the exemplary embodiment of the prior art (Case 1) and that of the present disclosure (Case 2). Similarly, hereinafter, a value in bold in the tables indicates a difference between that value for the exemplary case (Case 3 or Case 4) and the corresponding value in the prior art (Case 1). It is apparent from the efficiency values that the wireless power transfer efficiency has been greatly uniformized (reducing the checker board effect) over the possible position over the array, by changing the individual tuning frequency of some of the resonator units (when compared with the exemplary embodiments of the prior art, Case 1). It can further be seen that the average efficiency of the resonator array is approximately maintained but that all the efficiencies of wireless power transfer is lower than the optimal position (T1-R1) of the prior art (Case 1). The graph of FIGS. 18A and 18B also highlight the efficiencies (in dB and %) of the prior art (Case 1) and the different embodiments of the present disclosure (Cases 2, 3 and 4) (in dB).

Values for the Embodiment of the Present Disclosure of Modified Connections with Cables (Case 3):

In this example of the current embodiment, the resonator themselves are in parallel between the inductance and capacitance, and the resonators within the array of resonators are connected in anti-parallel to one another.

TABLE 7 values for the different resonators of the wireless power system of the present disclosure when using the modified connection with cables (Case 3) between the resonators of the repeater resonator array (stimulation input).

| Individual resonator values | Inductance (L) [uH] | Capacitance (C) [pF] | Resistance (ESR) [ohm] | Individual Resonant Tuning Frequency (f) [MHz] |
|---|---|---|---|---|
| Transmitter (TS) | 1.70 | 66.22 | 0.105 | 15 |
| Receiver (RL) | 1.70 | 66.22 | 0.105 | 15 |
| Repeater 1 (L11) | 2.49 | 45.21 | 0.73 | 15 |
| Repeater 2 (L12) | 2.49 | 45.21 | 0.73 | 15 |
| Repeater 3 (L13) | 2.49 | 45.21 | 0.73 | 15 |

TABLE 8 magnetic coupling factors between the different resonators of the wireless power system of the present disclosure when using the modified connection with cables (Case 3) between the resonators of the repeater resonator array (stimulation input).

| Magnetic Coupling Factor (K) | TS | L11 | L12 | L13 | RL |
|---|---|---|---|---|---|
| TS | 1 | 0.2219 | 0 | 0 | 0 |
| L11 | 0.2219 | 1 | −0.08 | 0 | 0 |
| L12 | 0 | −0.08 | 1 | −0.08 | 0 |
| L13 | 0 | 0 | −0.08 | 1 | 0.056* |
| RL | 0 | 0 | 0 | 0.056* | 1 |

TABLE 9 efficiency values, depending on the receiver position, for the wireless power system of the present disclosure when using the modified connection with cables (Case 3) between the resonators of the repeater resonator array (stimulation output).

| Efficiency Depending on the Receiver Position (TS over L11) | | RL position 1 (over L11) | RL position 2 (over L12) | RL position 3 (over L13) | Array average |
|---|---|---|---|---|---|
| Efficiencies with 15 MHz of operating frequency | dB | −3.302 | −6.151 | −5.325 | −4.756 |
| | % | 46.75 | 24.26 | 29.34 | 33.45 |

From the efficiencies of wireless power transfer of this exemplary embodiment of using modified connections with cables (Case 3) in between the resonators of the repeater resonator array, it can be seen: that the efficiencies are more uniform than in Case 1 but less uniform than in Case 2, and that the maximum efficiency and average efficiency of the array are lower both in Cases 1 and 2. Despite those results, the embodiment of Case 3 can be a preferred embodiment in some applications since Case 3 is more stable than Case 2 when the array is modular, changes size, changes pattern or does not have an adaptative tuning system. Indeed, Case 2 drops drastically in efficiency in those situations. An example of such an application can be for a surface of wireless data transfer where the efficiencies can be low but need a certain uniformity for a multitude of different sized areas.

Values for an Embodiment of the Present Disclosure of Modified Connections with Cables and Different Individual Tuning Frequencies (Case 4):

In this example of the current embodiment, the resonators themselves are in parallel between the inductance and capacitance, the resonators within the array of resonators are connected in anti-parallel to one another and the resonators of the resonator array can have different tuning frequencies than the operating frequency.

TABLE 10 values for the different resonators of the wireless power system of the present disclosure when using the modified connection with cables and different tuning frequencies (Case 4) between the resonator of the repeater resonator array (simulation input).

| Individual resonator values | Inductance (L) [uH] | Capacitance (C) [pF] | Resistance (ESR) [ohm] | Individual Resonant Tuning Frequency (f) [MHz] |
|---|---|---|---|---|
| Transmitter (TS) | 1.70 | 66.22 | 0.105 | 15 |
| Receiver (RL) | 1.70 | 66.22 | 0.105 | 15 |
| Repeater 1 (L11) | 2.49 | 40.44 | 0.73 | 15.86 |
| Repeater 2 (L12) | 2.49 | 40.44 | 0.73 | 15.86 |
| Repeater 3 (L13) | 2.49 | 40.44 | 0.73 | 15.86 |

TABLE 11 magnetic coupling factors between the different resonators of the wireless power system of the present disclosure when using the modified connection with cables and different tuning frequencies (Case 4) between the resonators of the repeater resonator array (simulation input).

| Magnetic Coupling Factor (K) | TS | L11 | L12 | L13 | RL |
|---|---|---|---|---|---|
| TS | 1 | 0.2219 | 0 | 0 | 0 |
| L11 | 0.2219 | 1 | −0.08 | 0 | 0 |
| L12 | 0 | −0.08 | 1 | −0.08 | 0 |
| L13 | 0 | 0 | −0.08 | 1 | 0.056* |
| RL | 0 | 0 | 0 | 0.056* | 1 |

TABLE 12 efficiency values, depending on the receiver position, for the wireless power system of the present disclosure when using the modified connection with cables and different tuning frequencies (Case 4) between the resonators of the repeater resonator array (simulation output).

| Efficiency Depending on the Receiver Position (TS over L11) | | RL position 1 (over L11) | RL position 2 (over L12) | RL position 3 (over L13) | Array average |
|---|---|---|---|---|---|
| Efficiencies with 15 MHz of operating frequency | dB | −0.732 | −0.845 | −0.619 | −0.731 |
| | % | 84.49 | 82.32 | 86.72 | 84.51 |

From the results of the simulation of Case 4 (that is a combination of two aspects of the present disclosure), it can be seen that the checkerboard effect is almost completely suppressed (the wireless power transfer efficiency is almost completely uniform across the array) and that the average efficiency of the array is greatly improved when compared to each other Case presented in this exemplary study (Cases 1, 2 and 3). The only aspect that is slightly less favorable than in the other cases is that the maximum efficiency of wireless power transfer of Case 4 (T1-R3) is slightly lower than the maximum efficiency of Case 1 (T1-R1). Furthermore, Case 4 presents the most uniform and stable embodiment in this exemplary study relative to a change in the number of resonators in the array, the pattern, the shapes, the size of the resonators or the array, etc.

Although the invention has been described with reference to preferred embodiments, it is to be understood that modifications may be resorted to as will be apparent to those skilled in the art. Such modifications and variations are to be considered within the purview and scope of the present invention.

Representative, non-limiting examples of the present invention were described above in detail with reference to the attached drawing. This detailed description is merely intended to teach a person of skill in the art further details for practicing preferred aspects of the present teachings and is not intended to limit the scope of the invention. Furthermore, each of the additional features and teachings disclosed above and below may be utilized separately or in conjunction with other features and teachings.

Moreover, combinations of features and steps disclosed in the above detailed description, as well as in the experimental examples, may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

What is claimed is:

1. A wireless power transfer apparatus configured for providing wireless power at an operating frequency within a defined boundary to a device, through a receiver resonator for the device, to be placed on a surface associated with an array of resonators within the defined boundary, the apparatus comprising:
   the array of resonators comprising resonators that are interconnected to other resonators of the array of resonators achieved through intermediary components that are one or more of capacitive components and inductive components, wherein each resonator of the array of resonators comprises a coil, wherein at least one of the resonators of the array of resonators is connected through two of the intermediary components to two other resonators of the array of resonators, the coils of neighbouring resonators of the array of resonators loosely coupled with respect to one another, wherein at least one of the intermediary components has at least two ports with each of the at least two ports being connected to a different resonator of the array of resonators;
   a powered resonator for providing power through electromagnetic resonance to the array of resonators,
   wherein the powered resonator is powered at the operating frequency,
   wherein the powered resonator is an external resonator for powering the array of resonators from above or below the array of resonators;
   wherein power is transferred through electromagnetic field coupling at the operating frequency from the powered resonator to any resonator of the array of resonators for delivering wireless power to the device through the resonators of the array of resonators across the surface associated with the array of resonators.

2. The apparatus as defined in claim 1, wherein each resonator of the array of resonators has a different tuning frequency with respect to one another.

3. The apparatus as defined in claim 1, wherein at least some resonators of the array of resonators are positioned at an angle with respect to one another or are positioned on different parallel planes.

4. The apparatus as defined in claim 1, wherein coupling coefficients between the receiver resonator of the device and a resonator of the array of resonators are not equal for different resonators of the array of resonators.

5. The apparatus as defined in claim 1, wherein coupling coefficients between the powered resonator and a resonator of the array of resonators are not equal for different resonators of the array of resonators.

6. The apparatus as defined in claim 1, further comprising one or more of:
   a plurality of the powered resonators;
   a plurality of the receiver resonators;
   one or a plurality of repeater resonators that are not positioned in the array of resonators; and
   a plurality of the array of resonators.

7. The apparatus as defined in claim 1, wherein the array of resonators has an internal or external adaptive reactance or wherein the resonators of the array of resonators have an internal or external adaptive reactance.

8. The apparatus as defined in claim 1, wherein the array of resonators improves one or more characteristics provided by a metamaterial selected from:
   a change in direction of an electromagnetic field;
   a focusing of an electromagnetic field;
   a defocusing of an electromagnetic field;
   an increase in electromagnetic isolation of a component from its environment; and
   an increase in electromagnetic field coupling between two or more electromagnetic components.

9. The apparatus as defined in claim 1, wherein the wireless power transfer is used for transfer of data contained within a wirelessly transferred wave between the powered resonator, the array of resonators and the receiver resonator of the device.

10. The apparatus as defined in claim 1, wherein at least one of reactance, inductance and capacitance of one or more of the resonators of the array of resonators is adaptive, or at least one of reactance, inductance and capacitance of the array of resonators is adaptive, wherein the array of resonators does not lose functionality at the operating frequency when one or more resonators of the array of resonators is cut, deactivated or electromagnetically interfered with.

11. The apparatus as defined in claim 1, wherein the resonators of the array of resonators are integrated into a floor, a ceiling or a wall.

12. Furniture comprising the apparatus as defined in claim 1, wherein the array of resonators is joined to a flat surface of the furniture.

13. A method of providing wireless power at an operating frequency within a defined boundary to a device, through a receiver resonator for the device, to be placed on a surface within the defined boundary, comprising:
   receiving wireless power at the operating frequency from a powered resonator that provides power through electromagnetic resonance to an array of resonators comprising resonators that are interconnected to other resonators of the array of resonators achieved through intermediary components that are one or more of capacitive components and inductive components, wherein each resonator of the array of resonators comprises a coil, wherein at least one of the resonators of the array of resonators is connected through two of the intermediary components to two other resonators of the array of resonators, the coils of neighbouring resonators of the array of resonators loosely coupled with respect to one another, wherein at least one of the intermediary components has at least two ports with each of the at least two ports being connected to a different resonator of the array of resonators;

transferring power from the powered resonator to any resonator of the array of resonators for delivering wireless power to the device through the resonators of the array of resonators across the surface associated with the array of resonators.

14. The method as defined in claim 13, wherein the array of resonators improves an increase in magnetic field coupling provided by a metamaterial.

* * * * *